(12) United States Patent  (10) Patent No.: US 7,624,928 B2
Kimura et al.  (45) Date of Patent: Dec. 1, 2009

(54) METHOD AND APPARATUS FOR MAKING TAGS, TAG, AND SYSTEM FOR MANAGING ARTICLES

(75) Inventors: Tetsuya Kimura, Ashigarakami-gun (JP); Tadashi Shimizu, Ashigarakami-gun (JP); Kensuke Ito, Ashigarakami-gun (JP); Shinichi Yada, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 790 days.

(21) Appl. No.: 11/281,562

(22) Filed: Nov. 18, 2005

(65) Prior Publication Data

US 2007/0115499 A1  May 24, 2007

(51) Int. Cl.
*G06K 19/05* (2006.01)
(52) U.S. Cl. .................................. 235/494; 235/462.09
(58) Field of Classification Search ................. 235/494, 235/380, 385, 462.09, 462.1
See application file for complete search history.

(56) References Cited

U.S. PATENT DOCUMENTS

| | | | |
|---|---|---|---|
| 4,423,415 A | 12/1983 | Goldman | |
| 4,820,912 A | 4/1989 | Samyn | |
| 5,521,984 A | 5/1996 | Denenberg et al. | |
| 5,673,338 A | 9/1997 | Denenberg et al. | |
| 6,263,438 B1* | 7/2001 | Walker et al. | ............... 713/178 |
| 7,266,215 B2* | 9/2007 | Ikenoue et al. | ............... 382/100 |
| 7,308,110 B2* | 12/2007 | Rhoads | ....................... 382/100 |
| 7,412,074 B2* | 8/2008 | Powell et al. | ............... 382/100 |
| 2003/0156294 A1 | 8/2003 | D'Agraives et al. | |
| 2003/0210802 A1 | 11/2003 | Schuessler | |
| 2004/0079800 A1 | 4/2004 | Sugino et al. | |

FOREIGN PATENT DOCUMENTS

| | | |
|---|---|---|
| DE | 24 58 705 | 9/1975 |
| JP | B2 6-16312 | 3/1994 |
| JP | B2 16312 | 3/1994 |
| JP | A 2001-100623 | 4/2001 |
| JP | A 2002-103782 | 4/2002 |
| JP | A 2002-117165 | 4/2002 |
| JP | A 2004-94510 | 3/2004 |

* cited by examiner

*Primary Examiner*—Daniel St. Cyr
(74) *Attorney, Agent, or Firm*—Oliff & Berridge, PLC

(57) ABSTRACT

A method of creating a tag, the method including: reading, over a first region of a surface of an individual piece, a characteristic having randomness distributed over the surface of the individual piece and converting image information indicative of the read characteristic of the first region into individual piece information peculiar to the individual piece; forming an individual piece information image indicative of the individual piece information on the surface of the individual piece while using a second region having a predetermined range including the first region as a non-image forming region; and creating the tag, which is to be affixed to an article, from the individual piece.

15 Claims, 16 Drawing Sheets

F I G. 4A
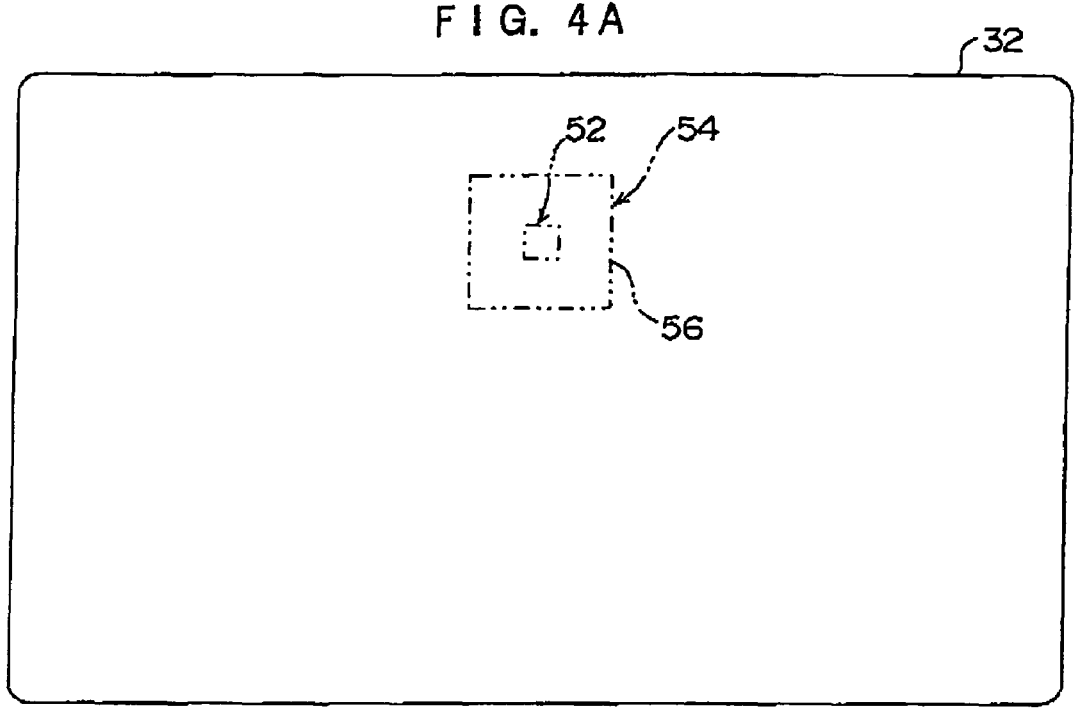
F I G. 4B
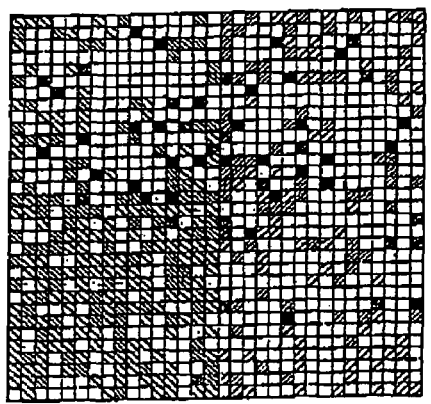

VERIFICATION IMAGE
64 DOTS × 64 DOTS (4 MM × 4 MM)

REFERENCE IMAGE,
32 DOTS × 32 DOTS (2 MM × 2 MM)

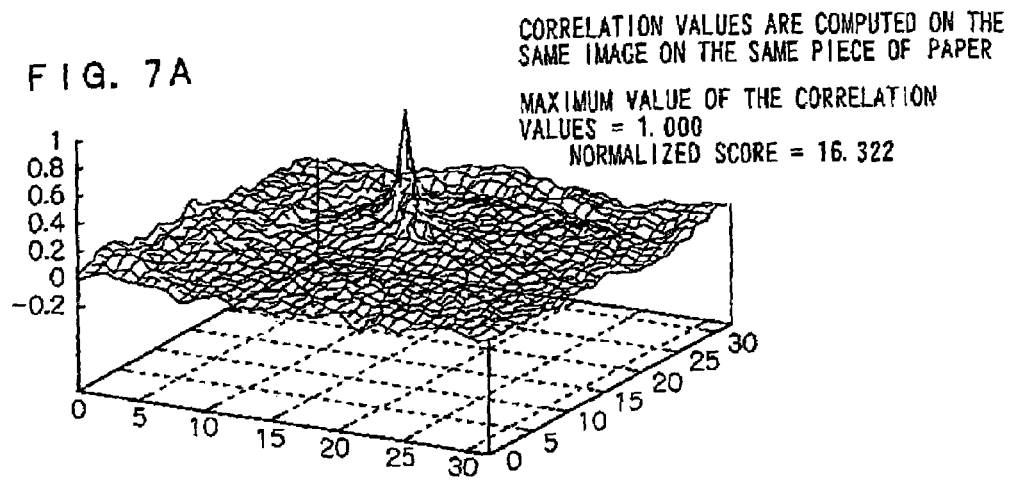

FIG. 7A

CORRELATION VALUES ARE COMPUTED ON THE SAME IMAGE ON THE SAME PIECE OF PAPER

MAXIMUM VALUE OF THE CORRELATION VALUES = 1.000
NORMALIZED SCORE = 16.322

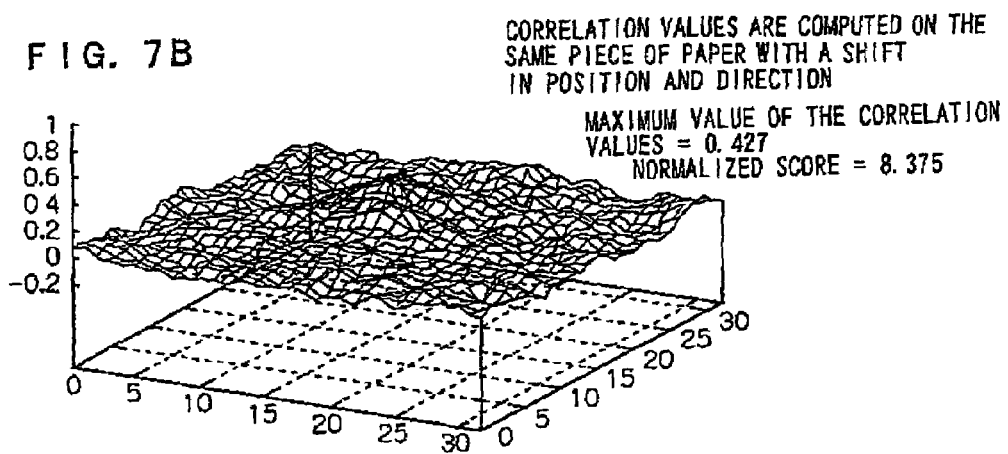

FIG. 7B

CORRELATION VALUES ARE COMPUTED ON THE SAME PIECE OF PAPER WITH A SHIFT IN POSITION AND DIRECTION

MAXIMUM VALUE OF THE CORRELATION VALUES = 0.427
NORMALIZED SCORE = 8.375

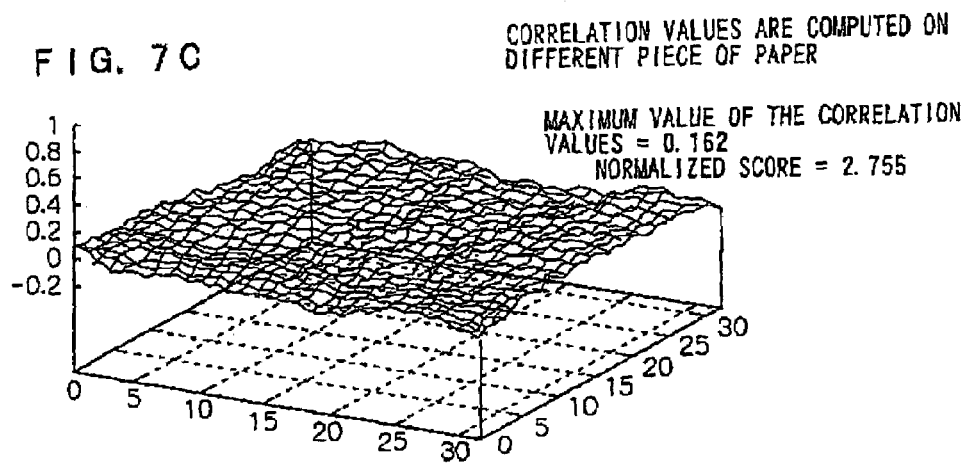

FIG. 7C

CORRELATION VALUES ARE COMPUTED ON DIFFERENT PIECE OF PAPER

MAXIMUM VALUE OF THE CORRELATION VALUES = 0.162
NORMALIZED SCORE = 2.755

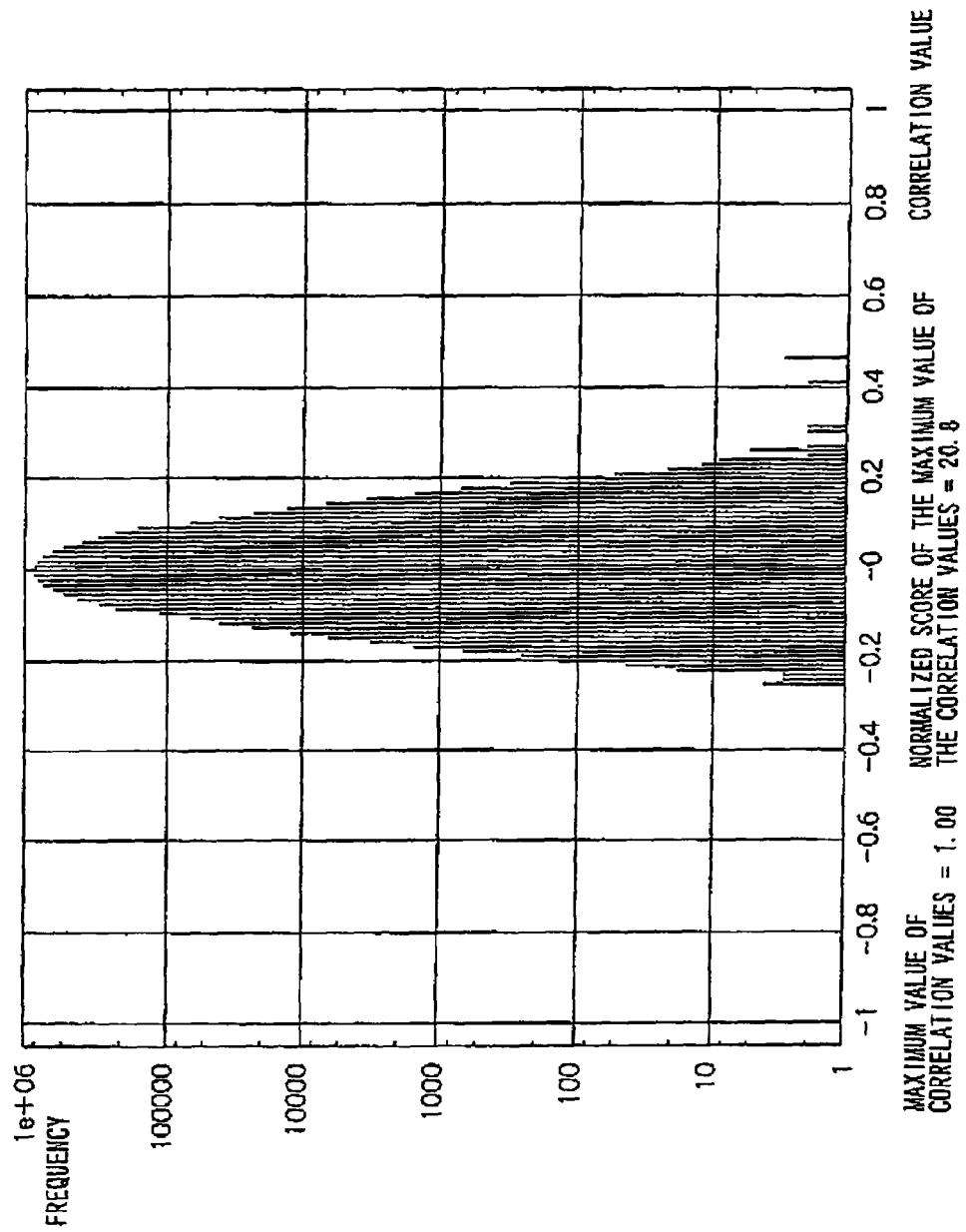

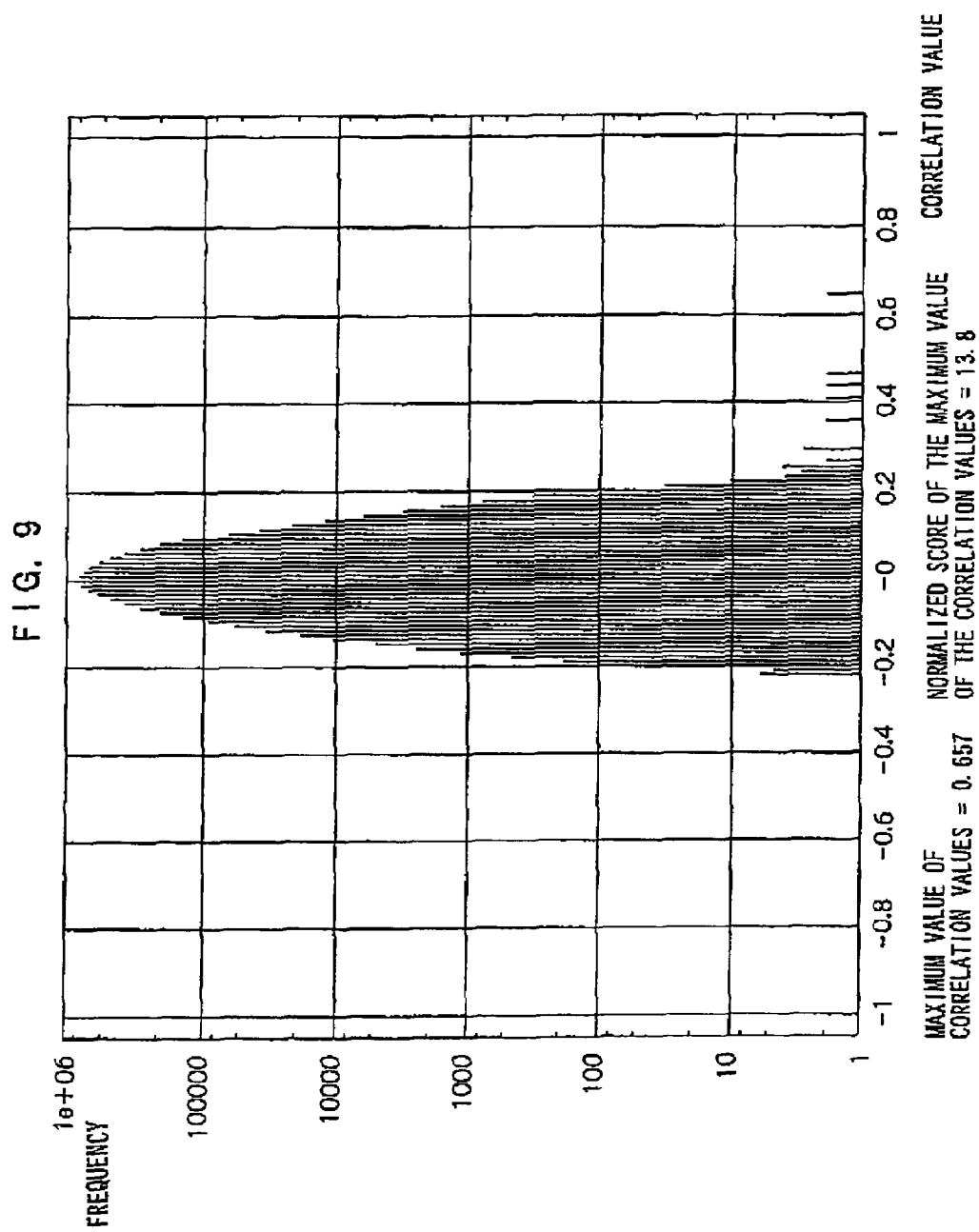

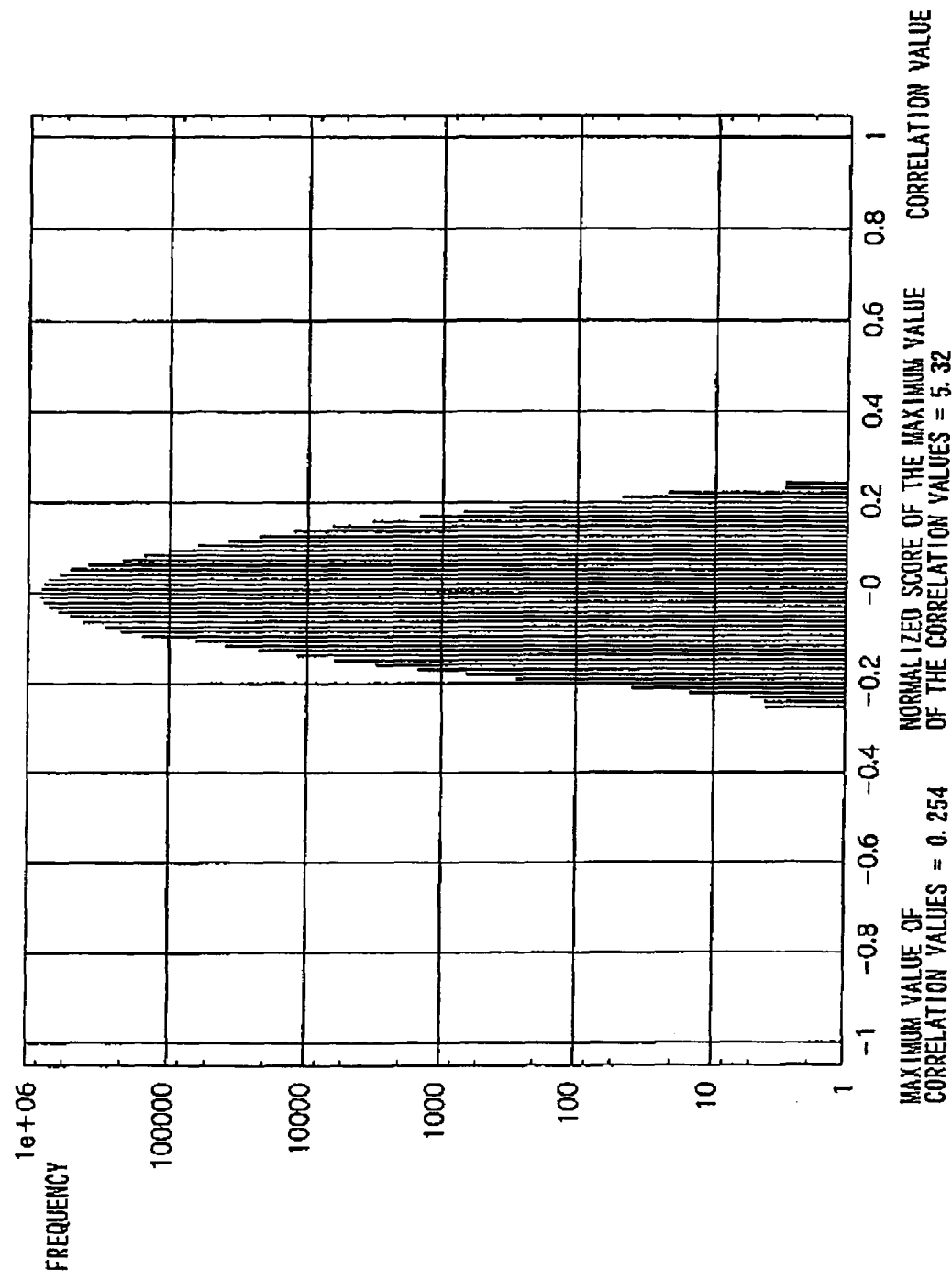

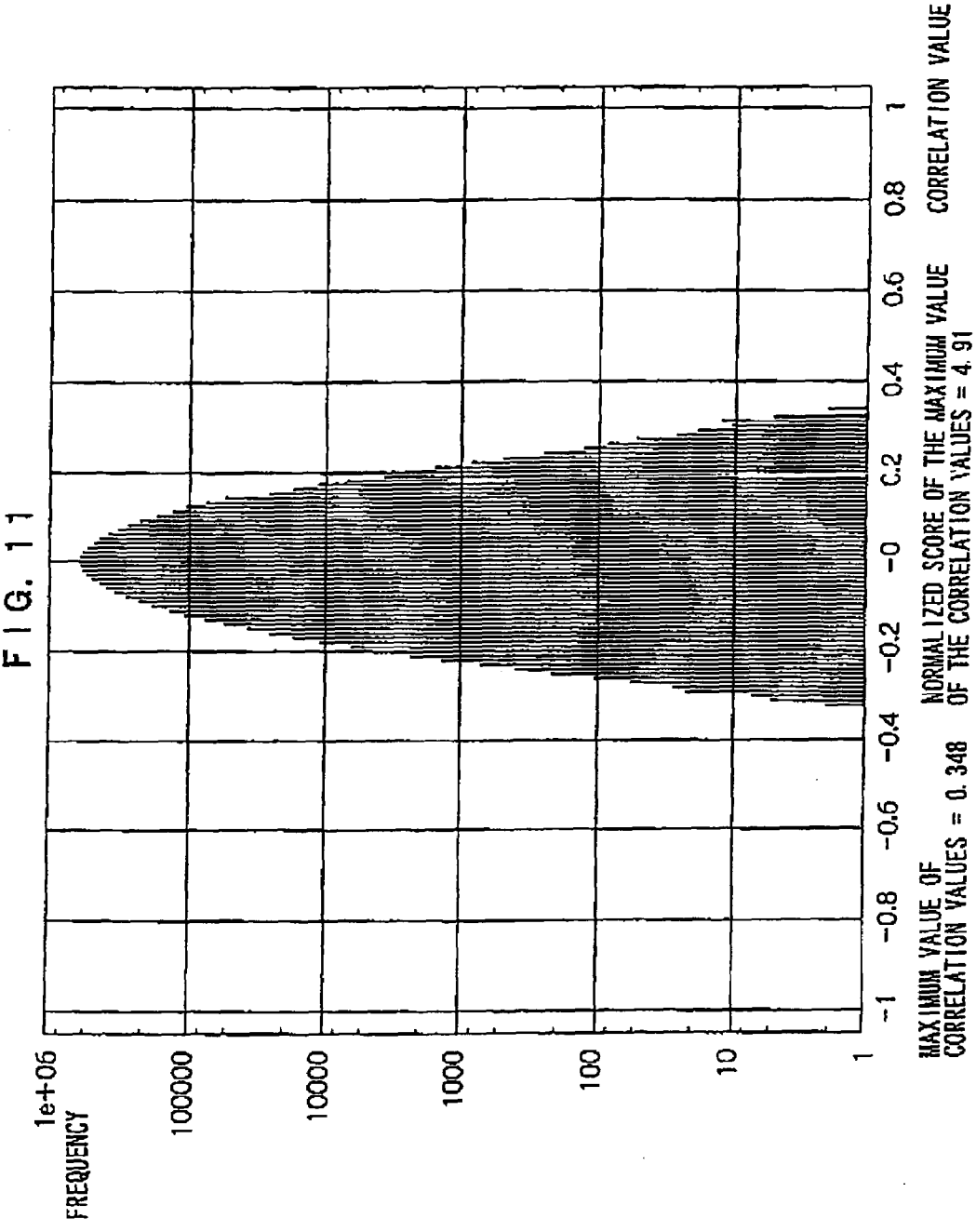

F I G. 1 2
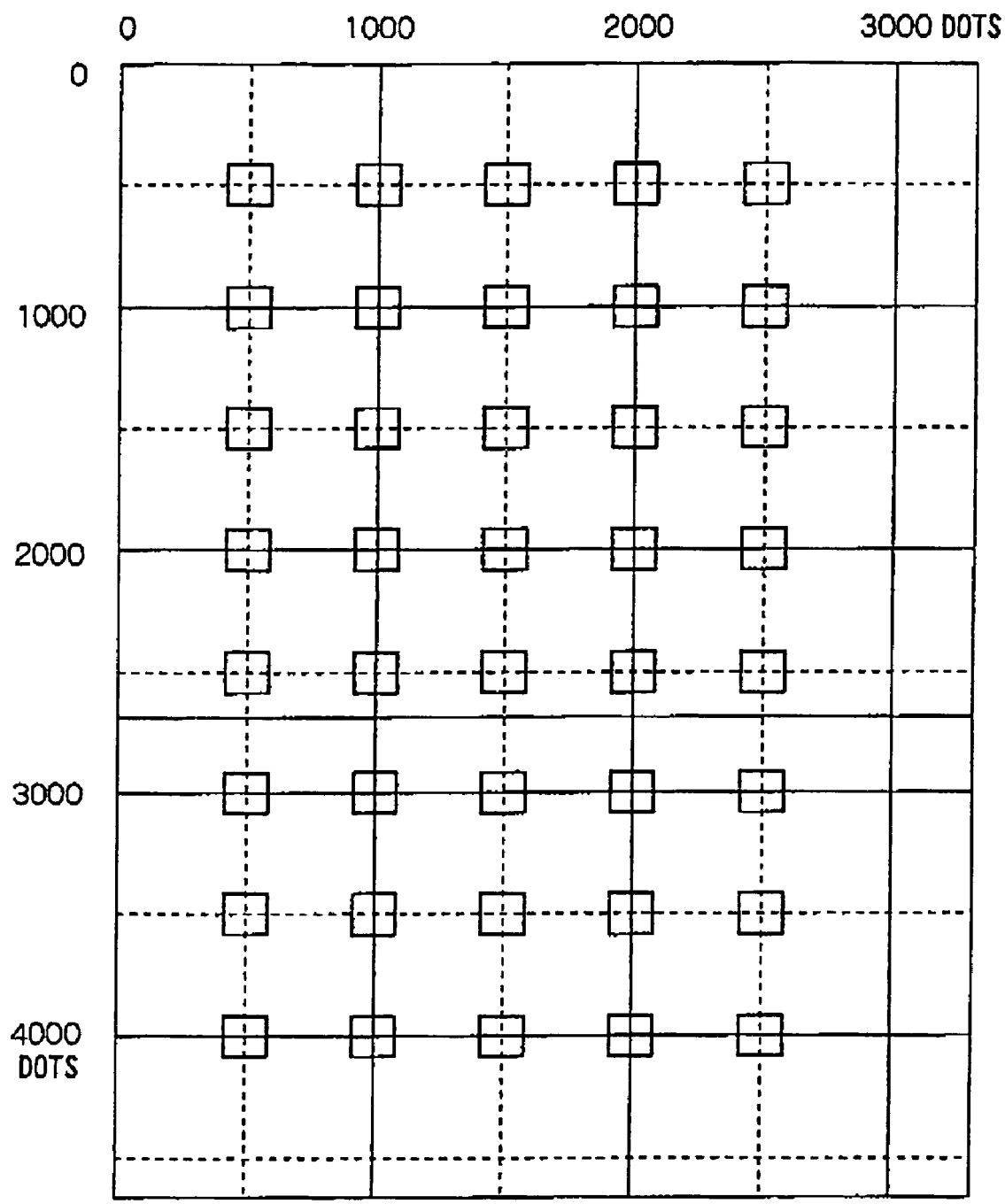

METHOD AND APPARATUS FOR MAKING TAGS, TAG, AND SYSTEM FOR MANAGING ARTICLES

BACKGROUND OF THE INVENTION

1. Field of the Invention

The present invention relates to a tag affixed to a variety of articles and more specifically to a method and apparatus for making tags, a tag, and a system for managing articles to which the tag is affixed.

2. Description of the Related Art

With recent improvements in performance of copy machines and printers and in processing capabilities of personal computers, it has become more and more likely for bank bills and securities as well as a variety of documents such as passports, various documents of title, and certificates to be replicated; therefore, there is a desire for establishment of a technology that can highly accurately judge whether various documents are real or fake.

Further, conventionally, imitations of industrial products including so-called brand products have been manufactured and distributed, in which imitation tags have been replicated using a copy machine, a printer, etc. Furthermore, tags for agricultural products have been increasingly forged to deceptively label their place of production In view of the above, a proposal has been made to make a hologram indicative of data of a commercial product and embedding the hologram around a mark that makes the product identifiable to enable determination of authenticity of the product, thereby preventing imitation of the product (see, for example, Japanese Patent Application Laid-Open (JP-A) No. 2001-100623).

Further, a proposal for a product verification system, which provides a body of a brand mark on a commercial product with an identification element having a memory whose stored information can be read by electromagnetic induction and stores in this memory information unique to the body of the brand mark so that product verification is made possible, whereby forging can be prevented, has been made (see, for example, JP-A No. 2002-117165).

On the other hand, when any one of a variety of commercial products is manufactured, a label or a tag recording information about the product is affixed. Therefore, a proposal has been made for performing printing by use of functional ink on, for example, a starch surface of an adhesive paper of the label, to enable confirmation of the authenticity of the label in a predetermined environment or by using a predetermined appliance (see, for example, JP-A No. 2002-103782).

Another proposal has been made to use a rewritable label allowing erasure and writing of information as a tamper-proof invoice form and shipment form, to write a serial number on the rewritable label so as to be non-erasable and write the serial number and commercial product information of a supplier on the invoice form and write part of the contents of the invoice form as well as new product information and the serial number on the shipment form in a tamper-proof manner, thereby preventing deceptive labeling (see, for example, JP-A No. 2004-94510).

However, these proposals necessitate creation of a hologram or implementation of special printing and require relatively expensive components such as an IC tag or a rewritable label. Further, despite such expense and special processing, they cannot always be capable of adequate prevention of imitation, deceptive labeling, etc.

That is, whereas a label or a tag to be affixed to a commercial product would be most inexpensive if paper is used as a material thereof, in comparison therewith, all of these proposals would lead to an increase in costs.

As for cases where paper is used as the material, a proposal has been made for partitioning a predetermined area of a tag into numerous quadrilateral regions while utilizing randomness in degree of transparency of the paper owing to randomness in intertwining of fiber materials of the paper, detecting transparency degrees of six quadrilateral regions selected at random from among these regions, and storing these detected transparency degrees as information together with addresses of these quadrilateral regions so that the respective quadrilateral regions specified by the stored information may be detected, to compare a result of this detection to the transparency degrees given by the recorded information, and to thereby determine whether the labeling is real or fake (see, for example, Japanese Patent Application Publication (JP-B) No. 6-16312).

However, in the proposal of JP-B No. 6-16312, real-or-fake determination requires the use of recorded information, and thus the proposal, has a problem in that it cannot be conducted by a simple operation at an arbitrary timing. That is, the proposal has a problem in that real-or-fake determination can be conducted only if particular data is available or only where such data can be read.

SUMMARY OF THE INVENTION

The present invention has been made in view of the above circumstances and provides a method and apparatus for making tags, a tag, and a system for managing articles to which the tag is affixed that enable conducting real-or-fake determination with respect to these articles at an arbitrary timing by using tags affixed to a variety of articles such as commercial products.

In the present invention, a tag to be affixed to each of a variety of kinds of articles such as industrial products, agricultural products, documents, and certificates, each of packaged bodies in which a single article is packaged, and each of multi-pack bodies in which plural articles are packaged together hereinafter generically referred to as an article) is used and real-or-fake determination is preformed with respect to the affixed tag, whereby it is determined whether the article is the original one identified by the tag. That is, in the present invention it is determined whether the tag contains original information, to thereby determine whether it has been created to match an article, a packaged product, or a multi-pack product, thus enabling determination of whether the article to which the tag is affixed is a so-called real one, or a so-called forged one, or imitation.

In the present invention, a characteristic having randomness of an individual piece such as a piece of paper that constitutes a tag is read and the characteristic is recorded on the piece as piece information In conducting real-or-fake determination with respect to the tag, it can be checked whether the piece information recorded in the tag is contained in the piece of the tag, to accurately determine whether the tag is real or fake without using piece information recorded for each of the pieces beforehand.

Such a tag creating method that can achieve the object of the present invention is a method of creating a tag, the method including: reading, over a first region of a surface of an individual piece, a characteristic having randomness distributed over the surface of the individual piece and converting image information indicative of the read characteristic of the first region into individual piece information peculiar to the individual piece; forming an individual piece information image indicative of the individual piece information on the surface of the individual piece while using a second region having a predetermined range including the first region as a non-image forming region; and creating the tag, which is to be affixed to an article, from the individual piece.

The present invention also provides a tag which is made of an individual piece over whose surface a characteristic having randomness is distributed, wherein a second region including a first region which is set on the surface of the individual piece is provided as a non-image portion, and an individual piece information image, which makes the individual piece identifiable, is formed based on the characteristic indicative of the first region read from the first region.

According to the present invention, a characteristic read from a first region, which is set in a surface of an individual piece such as a piece of paper that constitutes a tag, is used as piece information so that a piece information image based on this piece information may be formed on the piece, to create the tag.

It is thus possible to compare piece information obtained by reading the piece information image and a second region with each other, to determine whether the first region indicated by the piece information exists, and to thereby determine whether the tag is real or fake.

Therefore, piece information stored separately from the individual piece is not used, thus enabling conducting of real-or-fake determination at an arbitrary timing.

In the tag creating method of the present invention, a two-dimensional code can be used as the above-described piece information, and the piece information image formed on the above-described piece surface can use a two-dimensional code image.

The two-dimensional code can contain a lot of information and can be read automatically using a machine etc., thereby facilitating conducting of real-or-fake determination with respect to a tag.

The invention also provides an apparatus for creating a tag, the apparatus including: a first region reading section for reading, over a first region of a surface of an individual piece, a characteristic having randomness distributed over the surface of the individual piece which is used to create a tag to be affixed to an article; a read information conversion section for converting image information indicative of the first region read by the first region reading means into individual piece information peculiar to the individual piece; and an image forming section for forming an individual piece information image indicative of the individual piece information converted by the read information conversion section on the surface of the individual piece while using a second region set in a predetermined range including the first region of the surface of the individual piece as a non-image forming region.

Further, the tag creating apparatus may further includes a code conversion section for converting the individual piece information into a two dimensional code, wherein a two-dimensional code image is formed as the individual piece information image.

Furthermore, the tag creating apparatus may comprise an input section supplied with tag information that enables identifying the above-described tag so that the above-described image forming section can form on the above-described individual piece a tag information image based on tag information inputted from this input section, in which case the above-described tag information can contain, as the above-described tag information, information of the above-described article to which the above-described tag is affixed.

The invention also provides an article management system for managing an article to which a tag is affixed in which tag: a second region including a first region set on a surface of an individual piece on which a characteristic having randomness is distributed is provided as a non-image region; and an individual piece information image, which makes the individual piece identifiable, is formed based on the characteristic indicative of the first region read from the first region, the system including: a reading section for reading the characteristic of the surface of the individual pierce in the second region and the individual piece information image; an information conversion section for converting the characteristic of the second region read by the reading section and individual piece information based on the individual piece information image into information that can be contradistinguished; and a verification section for verifying whether the first region identified by the individual piece information from the information converted by the information conversion section is included in the second region, wherein based on a result of the verification by the verification section, whether the article is real or fake can be decided.

As described above, the present invention uses a tag to be affixed to each of a variety of kinds of articles such as industrial products, agricultural products, documents, and certificates, each of packaged bodies in which a single article is packaged, and each of multi-pack bodies in which plural articles are packaged together and determination of whether the affixed tag is created in accordance with an original format, thereby enabling deciding whether the article to which the tag is affixed is a so-called real one, or a so-called forged one, or imitation.

In this determinations different original information pieces peculiar to different tags recorded thereon are used. By using a peculiar characteristic having randomness over a surface of an individual piece such as a piece of paper that constitutes the tag, a highly accurate real-or-fake determination can be conducted, which provides an excellent effect.

BRIEF DESCRIPTION OF THE DRAWINGS

Preferred embodiments of the present invention will be described in detail based on the following figures, wherein:

FIG. 4A is a schematic diagram of a paper sheet that constitutes the tag;

FIG. 4B is a schematic image illustration of one example of a registered image read from a registration region on the paper sheet;

FIGS. 7A-7C are image illusions of an outlined distribution of correlation values as well as a maximum value and a normalized score of the correlation values;

FIG. 8 is a graph of a distribution of correlation values of a first verification image;

FIG. 9 is a graph of a distribution of correlation values of a second verification image;

FIG. 10 is a graph of a distribution of correlation values of a third verification image;

FIG. 11 is a graph of one example of a distribution of correlation values of a case where a probability of a fake item being determined to be a real item is high;

FIG. 12 is a schematic diagram of a position of a region to be read in testing of FRR confirmation;

DESCRIPTION OF THE PREFERRED EMBODIMENTS

Figure 1:
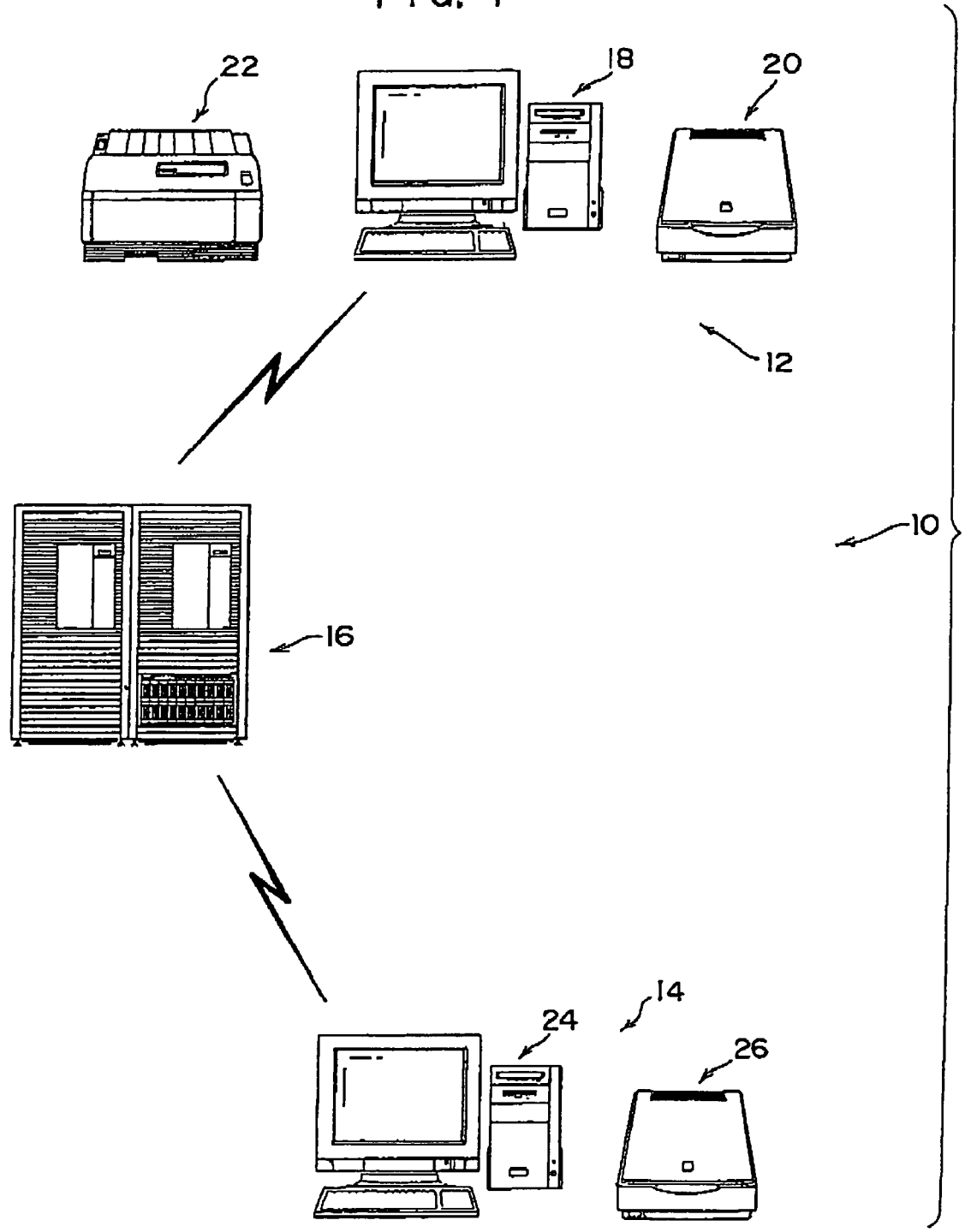
FIG. 1 is a schematic configuration diagram of a tag management system applied as an article management system in an embodiment.

Below, embodiments of the present invention will be described with reference to drawings. FIG. 1 shows a schematic configuration a tag management system 10 of the present embodiment. The tag management system 10 comprises a tag creation apparatus 12 and a tag authentication apparatus 14. The tag management system 10 can further comprise a database (data server) 16. The tag creation apparatus 12, the tag authentication 16, and the data server 16 only need, for example, to be connected to a network by using a public circuit network such as the Internet or a dedicated circuit so that data can be exchanged between the tag creation apparatus 12 and the data server 16 and between the tag authentication apparatus 14 and the data server 16.

The tag creation apparatus 10 uses a PC 18 for performing various kinds of image processing and data processing by use of for example, a workstation or a personal computer, a scanner 20 that serves as an image reading section for reading an image recorded on a sheet-shaped medium such as a manuscript, and a printer 22 that serves as a print processing section for forming (printing) an image on a predetermined medium. Further, the tag authentication apparatus 14 uses a PC 24 for performing various kinds of image processing, data processing, etc. and a scanner 26 for reading an image.

In the PCs 18 and 24, a CPU, a ROM, a RAM, a variety of input/output ports, and an HDD, in which an OS and a variety of application software (programs) are stored, are connected to each other through a bus and provided with a monitor (display device) and an input device such as a keyboard and a mouse, thereby making up a generic configuration that enables various kinds of image processing and data processing.

Further, in the tag creation apparatus 12, the scanner 20 and the printer 22 are connected to the PC 18 directly or via a network; in the tag authentication apparatus 14, the scanner 26 is connected to the PC 24 directly or via a network.

By this configuration, the PC 18 can perform various kinds of processing on image data read by the scanner 20 as well as print processing based on a result of the processing, while the PC 24 can perform various kinds of processing on image data read through the scanner 26.

Figure 2:
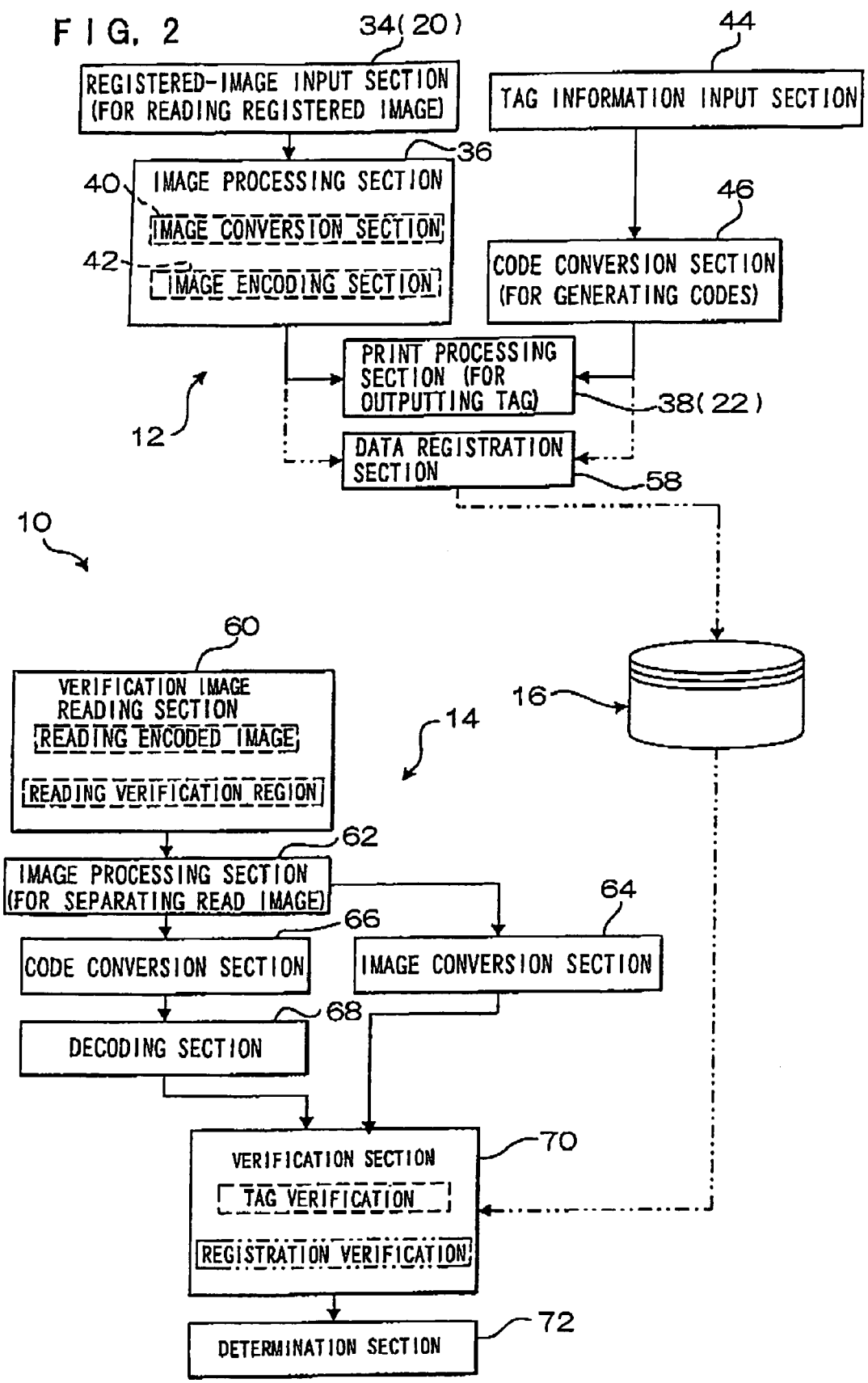
FIG. 2 is a block diagram of a schematic configuration of a tag creation apparatus and a tag authentication apparatus that constitute the tag management system.

FIG. 2 shows a schematic configuration of the tag creation apparatus 12 constituted of the PC 18, the scanner 20, and the printer 22 and that of the tag anthentication apparatus 14 constituted by the PC 24 and the scanner 26 Further, 3 shows one example of a tag 30 created by the tag creation apparatus 12, and FIG. 4 A shows a paper sheet 32, which is used to create the tag 30.

As shown in FIG. 2, the tag creation apparatus 12 comprises a registered-image input section 34, a registered-image processing section 36, and a print processing section 38. The registered-image input section 34 reads information regis-tered when the tag 30 is created from the paper sheet 32 (see FIG. 4A) by using the scanner 20 and outputs the information as image data.

In this case, the registered-image input section 34 reads light transmitted through or reflected by the paper sheet 32 and outputs as image data a characteristic having randomness distributed over a surface of the paper sheet 32. Further, the scanner 20 employed has a resolution of, for example, 400 dpi and reads a predetermined region (for example, 32 bits×32 bits (about 2 mm×2 mm)) on the surface of the paper sheet 32 by using an 8-bit gry scale gradation, FIG. 4B visualizes one example of image data obtained in this case.

The image processing section 36 comprises an image conversion section 40 and an image encoding section 42, to perform predetermined processing on image data input from the registered-image input section 34. Further, the image processing section 36 performs encoding processing as well as image conversion, to generate an encoded image in the image data (image data of the encoded image).

In this case, the image encoding section 42 performs encryption by use of an encryption key by applying a method of authenticating an electronic signature in accordance with a public key infrastructure (PKI). Further, the image encoding section 42 converts the encrypted data into a two-dimensional code such as a QR code. That is, image data which forms an encoded image which becomes a two-dimensional code, is generated.

Further, the tag creation apparatus 12 is provided with a tag information input section 44 for inputting tag information by using an input device such as a keyboard and a code conversion section 46 for converting input tag information into a predetermined code to thereby generate a code image (image data) of the tag information.

Figure 3:
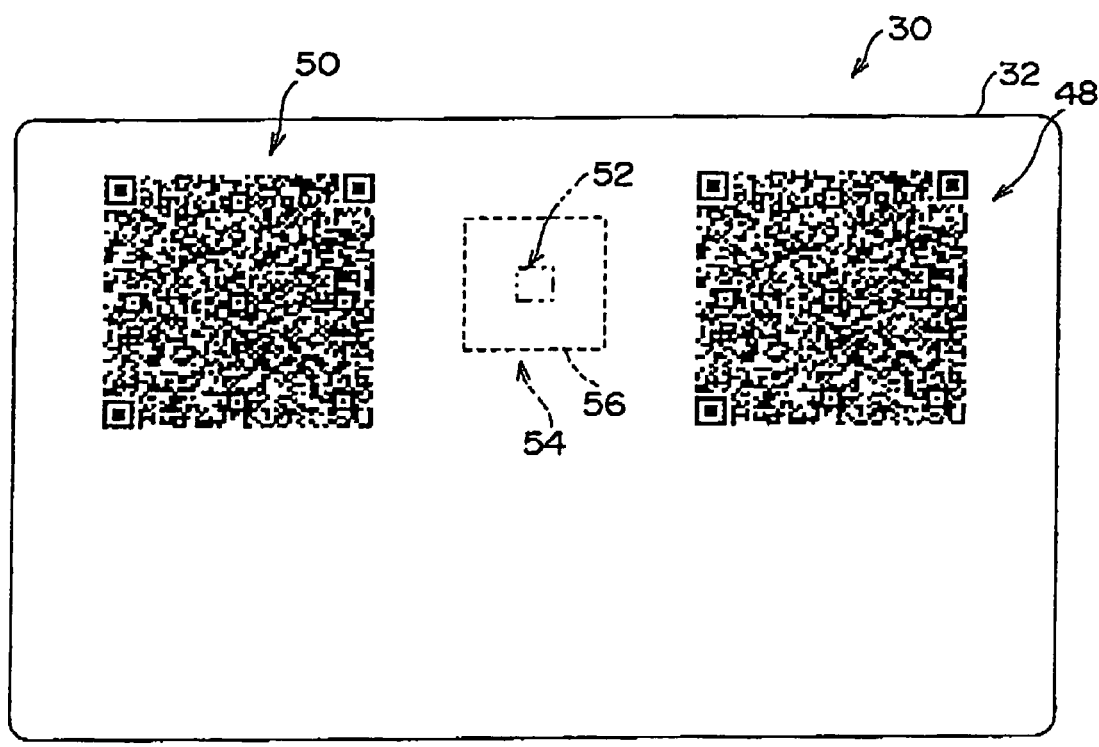
FIG. 3 is a schematic diagram showing one example of a tag to which the present invention is applied.

The print processing section 38 prints information including an encoded image generated by the image processing section 36 and a code image generated by the code conversion section 46 on the paper sheet 32 in a predetermined format, thereby creating the tag 30 (see FIG. 3).

In this case, the tag creation apparatus 12 excludes from a print region a predetermined range of regions including a region where the image data has been read by the scanner 20.

That is, as shown in FIG. 3, a print format of the tag creation apparatus 12 is provided such that a code image 48 giving tag information is printed on the upper right side of a paper surface of the tag 30 to be created, and an encoded image 50 giving a registered image is printed on the upper left side of the paper surface.

Further, the tag 30 has a margin between the code image 48 and the encoded image 50, below which a region is given in which a name, etc. of an item to which the tag 30 is affixed can be printed.

On the other hand, the tag creation apparatus 12 reads, as image data of a registered image, image data from a predetermined region 52 in the image between the code image 48 and the encoded image 50 that is defined as a registration region 52.

The tag authentication apparatus 14, which will be described later, is adapted to read as an authentication region 54 a predetermined region containing this registration region 52. It is to be noted that preferably the authentication region 54 has a size of about 64 dots×64 dots when the registration region 52 is assumed to have a size of 32 dots×32 dots. Further, an inside of the authentication region 54 may be prevented from becoming dirty by clearly specifying the authentication region 54 by using a closing line 56 in the tag creation apparatus 12.

It is to be noted that when the closing line 56 is provided, the authentication region 54 and the registration region 52 are made clear, and thus the tag 30 may be prevented from being forged by not recording the closing line 56.

As tag information recorded on such a tag as the code image 48, a product name that identifies a product to which the tag 30 is affixed, its model number, the number of pieces, its serial number, etc may be used. To affix the tag to a multi-pack body in which plural products are packaged, preferably the information may include the number of the packaged products.

Further, the tag information includes information that makes the tag 30 identifiable. As this information that identifies the tag 30, a serial number may be used which is set for each of the tags 30. That is, the tag information includes a serial number that is set for each of the tags 30.

Furthermore, the tag information can include a date of creation of the relevant product or the tag 30. Further, if an expiration date is set for the tag 30, preferably that expiration date may be contained in the tag information.

That is, as shown in FIG. 4A, the tag creation apparatus 12 reads transmitted light or reflected light that corresponds to a surface condition of the paper sheet 32 in the registration region, which becomes a non-print region, in accordance with a print format 30 for the tag 30 so that printed images do not overlap with each other in the authentication region 54 containing this registration region 52 as shown in FIG. 3.

The tag creation apparatus 12 uses a two dimensional code to record these information pieces on the tag 30, thereby enabling inclusion of a lot of information and prevention of the occurrence of errors in reading at the time of authentication etc. It is to be noted that besides a QR code, an arbitrary two-dimensional code can be applied to the code image 48 and the encoded image 50. In this case, data may be encoded through compression processing.

As shown in FIG. 2, such a tag creation apparatus 12 can be provided with a data registration section 58. This data registration section 50 registers data to the data server 16 etc. by correlating a serial number and a registered image with each other for each of the created tags 30. It is thus made possible to read a registered image of the tag 30 from the data server 16 by using the tag authentication apparatus 14.

On the other hand, the tag authentication apparatus 14 is provided with a verification image reading section 60, an image processing section 62, an image conversion section 64, a code conversion section 66, and a decoding section 68.

The verification image reading section 60 uses the scanner 26 to read the code image 48 and the encoded image 50 from the tag 30 as well as the verification region 54 containing the registration region 52, to output image da In this case, the scanner 26 reads the images by using a 400-dpi resolution and an 8-bit gray scale resolution. That is, the scanner 26 reads the images in such a manner as to match the scanner 20 at the time when the tag 30 is created by the tag creation apparatus 12.

The image processing section 62 separates image data of the code image 48, image data of the encoded image 50, and image data of the authentication region 54 Tom the read image data The image data of the authentication region 54 is converted by the image conversion section 64.

Further, a two-dimensional code of the image data of the encoded image 50 is converted by the code conversion section 66 and decoded by the decoding section 68 by using a public key. It is thus made possible to obtain image data of a registered image (registration region 52).

It is to be noted that as image data of a code image, data in accordance with the tag information is extrcted by performing image conversion. Further, image data of the verification region 54 converted by the image conversion section 64 and image data of a registered image (registration region 52) decoded by the decoding section 68 are stored in a memory such as the RAM or the HDD.

Further, the tag authentication apparatus 14 is provided with a verification section 70 and a determination section 72. The verification section 70 performs verification processing on image data in the verification region 54 and image data in the registration region 52 recorded on the tag 30 as the encoded image 50. The determination section 72 checks whether the tag 30 is proper that is, decides whether the tag 30 is real or fake based on a result of this verification.

It is to be noted that besides comparison between image data recorded as the encoded image 50 and that of the verification region 54 (tag verification), the verification section 70 can compare image data recorded as the encoded image 50 and that of an image registered in the data server 16 (registraton verification).

Below, processing conducted by the tag creation apparatus 12 and the tag authentication apparatus 14 in the tag management system 10 that are performed as operations of the present embodiment will be described.

First, validity of authentication of the tag 30 is explained by use of image data of the registration region 52 on the paper sheet 32 and image data of the verification region 54.

For example, paper of the paper sheet 32 that constitutes the tag 30 is random in the intertwining of its fiber materials, owing to which a degree of transparency of the piece of paper varies at random Further, how the fiber materials are intertwined with each other appears is reflected in irregularities in a surface of the paper, so that these irregularities in the surface of the paper also vary at random.

Therefore, a characteristic having randomness over a surface of an individual piece such as transparency of a piece of paper or irregularities in its surface can be applied as a characteristic peculiar to the individual piece to real-or-fake determination of the individual piece. Such a characteristic peculiar to the individual piece can be read as light transmitted through or reflected by the piece of paper by using any one of a variety of image readers such as a scanner.

On the other hand, the above-described characteristic peculiar to an individual piece such as a piece of paper is liable to lead to an error in determination owing to a difference in position or direction of a region to be read. Therefore, a region subject to comparison is made larger in area than a region subject to authentication, and a correlation value is computed repeatedly by moving the smaller-area region (region subject to authentication) in the larger-area region (region subject to comparison), to obtain a lot of correlation values, thereby conducting real-or-fake determination by using the obtained correlation values and a characteristic amount obtained from a distribution of the correlation values.

Determination will be made mistakenly either by determining a real article to be fake or by determining a fake one to be real, so that a probability of determining a real article to be fake is defined as a False Rejection Rate (FRR) and a probability of determining a fake article to be real is defined as a False Acceptance Rate (FAR); first a result of testing for verifying validity of the real-or-fake determination is given.

In his testing, first, by using a flat-bed type scanner, a reference region (that corresponds to the registration region 52 of the present embodiment) with a size of 32 dots×32 dots (about 2 mm×2 mm) of an unprinted region of a piece of paper used as a sample is read at a resolution of 400 dpi and an 8-bit gray scale gradation, so that image data output from the scanner is recorded as reference data.

Figure 5B:
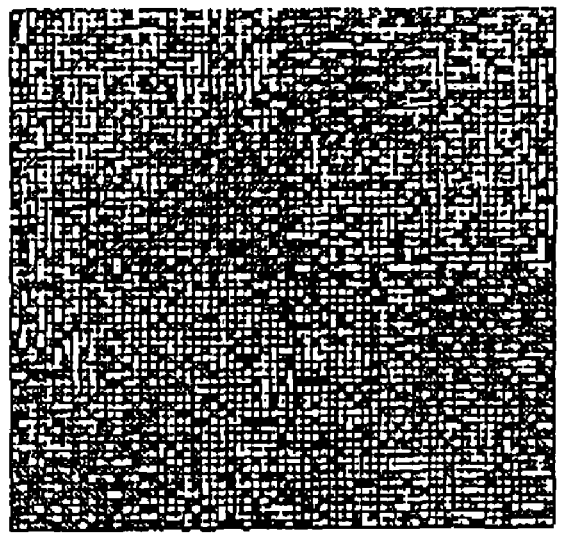
FIGS. 5A and 5B are schematic image illustrations used to explain testing of real-or-fake determination, FIG. 5A showing a registered image and FIG. 5B showing a verification image.
Figure 5A:
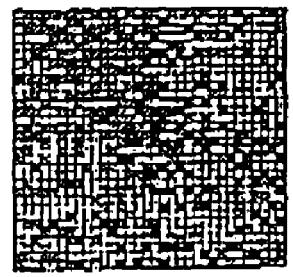

FIGS. 5A and 5B visibly illustrate this reference data as a reference image. It is to be noted that this reference image has been corrected in terms of contrast so that it can be easily (clearly) confirmed visually.

It is known that it is impossible to control at the time of manufacture of a piece of paper how fiber materials of the piece of paper are intertwined with each other, based on which a manner of this intertwining of the fiber materials of this piece of paper can be regarded as being random. This manner of intertwining of the fiber materials can be observed by a transmission-light microscope but cannot be confirmed on the basis of image data (reference image shown in FIG. 5A) read by a scanner having a resolution of 400 dpi.

However, the reference image has a random light-and-shade pattern that reflects a random variation in transparency of the piece of paper owing to randomness in the intertwine of the fiber materials. It is to be clearly noted that the light-and-shade pattern may possibly be influenced by irregularities in the surface of the piece of paper caused by various conditions under which the piece of paper is made and is thus random anyway.

Therefore, it is possible to confirm that reference data that corresponds to the reference image provides a characteristic peculiar to the piece of paper in the reference region on the piece of paper, that is, information indicative of a random change in transparency in the reference region.

Next of the piece of paper used as the sample, a verification region (that corresponds to the authentication region 54 of the present embodiment) having a size of 64 dots×64 dots (about 4 mm×4 mm) including the above-described reference region is read by the scanner, to record read image data as first verification data.

This first verification data expresses a random variation in transparency of the piece of paper in the verification region and is visibly illustrated in FIG. 5B as a verification image.

On the other hand, as a case where the probability of a real item is being decided to be fake (FR) is high, under conditions where the piece of paper used as the sample is placed on a manuscript bench of the scanner somewhat shifted in position and somewhat turned in direction with respect to the respective position and the direction at the time when the first verification data was acquired) the verification region with the size of 64 dots×64 dots is read, to record image data output from the scanner, as second verification data. That is, image data read from the region including the reference region that is somewhat different in position and direction from the region, from which the first verification data was read, is stored as the second verification data.

Further, from another piece of paper subject to comparison different from the piece of paper used as the sample, the verification region with the size of 64 dots×64 dots is read, to record image data output from the scanner as third verification data.

By thus acquiring the reference data and the first through third verification data pieces, correlation values are computed between the respective first through third verification images expressed by the first Rough third verification data pieces respectively and the reference image expressed by the reference data.

Figure 6:
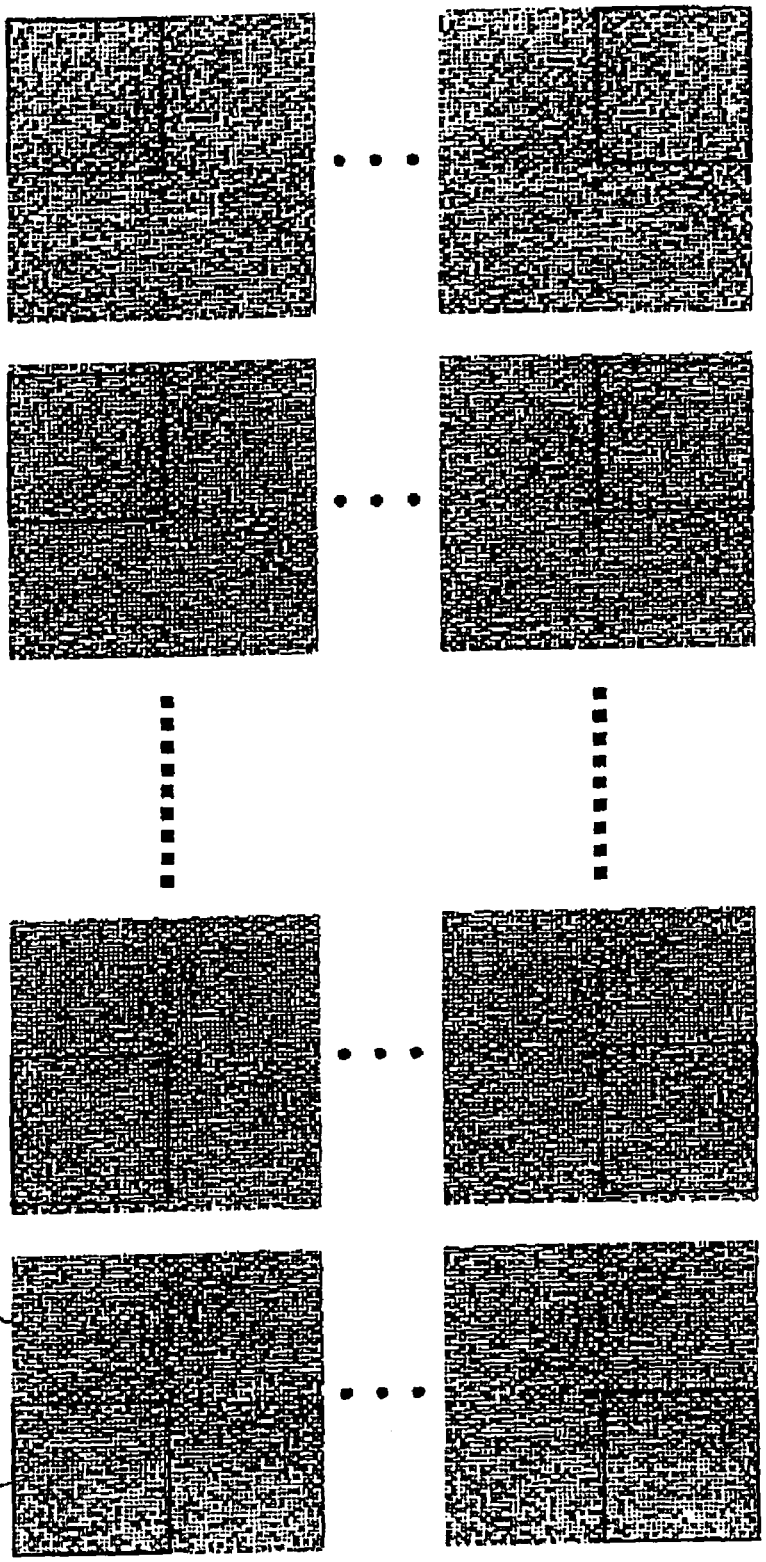
FIG. 6 is an image illustration used to explain computations of a correlation value between a registered image and a verification image in testing of real-or-fake determination.

Specifically, as shown in FIG. 6 as an example, from a verification image subject to computation, a partial region (which is shows as a correlation computation range enclosed by a solid line in FIG. 6) having the same size as that of the reference image is extracted, to compute a correlation value between the partial region (partial image) and the reference image by using the normalizing correlational method (see Equation (1)). This processing is repeated while shifting a position of the partial region on the verification image by one dot (one pixel) in X- and Y-directions.

$$F = \{f_i\}_{i=0}^{N-1}$$
$$G = \{g_i\}_{i=0}^{N-1}$$

$$\text{CORRELATION VALUE} = \frac{\sum_{n=0}^{N-1}(f_n - f_{AVE})(g_n - g_{AVE})}{\sqrt{\sum_{n=0}^{N-1}(f_n - f_{AVE})^2}\sqrt{\sum_{n=0}^{N-1}(g_n - g_{AVE})^2}}$$

Equation (1)

In Equation 1, F indicates a reference image (set of reference data pieces), fi indicates a value of brightness of an individual pixel of the reference image, N indicates a total number of pixels of the reference image (and partial region of the verification image), G indicates (a set of) partial regions of the verification image, gi indicates a brightness value of an individual pixel of the partial region of the verification image, fAVE indicates an average value of brightness of an individual pixel of the reference image, and gAVE indicates an average value of brightness of an individual pixel of the partial region of the verification image.

In his case, by performing the above-described computation on the fist through third verification images, (M−m+1)×(N−n+1) correlation values are obtained for one verification image given that the number of dots of the reference image is m×n and the number of dots of the verification image is M×N.

Subsequently, as a characteristic indicative of how the correlation values are distributed for each of the first through third verification images, a normalized score of a maximum value of the correlation values is computed by the following Equation (2):

Normalized score=(maximum value of correlation values−average value of correlation values)/standard deviation of correlation values    Equation (2)

FIGS. 7A-7C show computed results of a maximum value of correlation values and a normalized score of this maximum value together with a visualized flowchart of a relationship between a position of a partial region on a verification image and a correlation value.

As shown in FIG. 7A, in a case where a verification region including the reference region on the same piece of paper is read without shifts in position and direction with respect to the reference region (first verification image), a maximum value of correlation values is very high. Further, in a distribution of the correlation values, the correlation value is much lower tan the maximum value at portions except for a peak portion where the correlation value takes on a maximum value, which is accompanied by a very high value of a normalized score of the maximum value of the correlation values.

In contrast, in the case of a piece of paper (that does not include a reference image) that is different from the piece of paper from which the reference image is read (third verification image), a maximum value of correlation values is very low and overall correlation values including the peak are low in a distribution of the correlation values, with a normalized score of the maximum value of the correlation values also being very low.

On the other hand, as a case where the probability of a real item being determined mistakenly to be fake, if a verification region is read while changed in position and direction including the reference region (second verification image), a maximum value of correlation values and a normalized score of the maximum value of the correlation values are each an intermediate value between a value obtained when the same piece of paper is read with no shift in position and direction and a value obtained when a different piece of paper is read as shown in FIG. 7B.

Therefore, as threshold values of the maximum value of correlation values and the normalized score of the maximum value of the correlation values, intermediate values between values shown in FIG. 7B and those shown in FIG. 7C are employed respectively, so that by, for example, assuming the threshold value of the maximum value of the correlation values to be nearly equal to 0.3 and the threshold value of the normalized score of the maximum value of the correlation values to be nearly equal to 5.0, the maximum value of the correlation value can be compared to its threshold value and to the threshold value of the normalized score of the um value of the correlation values, to understandably improve an accuracy in real-or-fake determination as compared to determination by use of only the maximum value of the correlation values if the probability of a real item being determined mistakenly to be fake is high in such a case that the position and the direction of a piece of paper at the time of reading the verification region are somewhat shifted.

In another testing, the same scanner as in the previous testing is used to acquire reference data by reading as a reference region an arbitrary region with a size of 32 dots×32 dots (about 2 mm×2 mm) of an A4-size white piece of paper at the same resolution and gradation, and almost all of the surface of the piece of paper from which the reference data has been acquired is read as a first comparison example, so that from image data obtained by this reading, data of a verification region with a size of 64 dots×64 dots is extracted, and also from the extracted verification data, data of a partial region is extracted to compute a correlation value with respect to the reference data according to Equation (1), which processing is repeated while shifting the position of the partial region in the verification region by one dot, which results in at least 10 million correlation values being obtained.

Further, as a second comparison example, almost all of the surface of the piece of paper from which the reference data has been acquired is read again under conditions where the position was somewhat shifted and the direction was somewhat turned and, similar to the above-described first comparison example, data of a verification region with a size of 64 dots×64 dots was extracted from image data obtained by the reading, to compute a correlation value between data of a partial region extracted further from the extracted verification data and the reference data according to Equation (1), which processing is repeated while shifting the position of the partial region in the verification region by one dot. Further, as a third comparison example, a piece of paper different from that from which the reference data has been acquired is used to compute a correlation value from verification data acquired by reading similar to that in the first and second comparison examples.

Next, as a case where the probability of a fake item being determined mistakenly to be real is high, by reading a reference region of a piece of paper used as a manuscript with an excessive amount of light to acquire second reference data that represents an image in which a variation in degree of transparency in the reference region becomes partially whiter and reading almost all of a surface of a piece of paper used in the third comparison example to extract data of a verification region with a size of 64 dots×64 dots from image data obtained by the reading so that a correlation value between data of a partial region extracted further from the thus extracted verification data and the second reference data may be computed by the normalizing correlation method according to Equation (1), which processing is repeated while shifting a position of the partial region in the verification region by one dot.

Distributions (in which a horizontal axis represents a correlation value and a vertical axis represents a log of frequency) of correlation values obtained in the above-described testing pieces are shown in FIGS. 8-11. FIG. 8 shows a distribution of correlation values obtained in the first comparison example, and FIG. 9 shows that obtained in the second comparison example, in both of which, among a lot of correlation values, most of them are 0 or nearly 0 while including high data values being not less than a predetermined value (e.g., not less than 0.3) and a maximum in the first comparison example being a high value of 1.00 and that in the second comparison example also being a high value of 0.657, so that it can be appreciated that a real item can be determined to be real even by using only the maximum value of the correlation values.

Further, FIG. 10 is a distribution of correlation values obtained in the third comparison example, in which all of the correlation values are less than a predetermined value (e.g., 0.3) and a maximum of the correlation values has a low value of 0.254, so that a fake item can be determined to be fake even by using only the maximum value of the correlation values as in the case above.

On the other hand, FIG. 11 shows a distribution of correlation values obtained through testing in which such a case is assumed that the probability of a fake item being determined mistakenly to be real is high, which distribution also contains such data as to have a high correlation value not less than a predetermined value (e.g., not less than 0.3) (with a maximum value of the correlation value of 0.348), so that there is a possibility that a fake item may be determined instantly to be real if real-or-fake determination is conducted by using only the maximum value of the correlation values. In contrast, as is clear by comparing the distribution of FIG. 11 to that of FIG. 10, the correlation value distribution of FIG. 11 has a larger bottom width and so has a larger standard deviation of the correlation values than that of FIG. 10, so that as is clear from the above-described Equation (2), a value of a normalized score of the correlation values in the distribution of FIG. 11 is smaller than that in the distribution of FIG. 10 (the normalized score of the maximum value of the correlation values in the distribution of FIG. 10 is 5.32 and that of FIG. 11 is 4.91), thus making it understandable that it is possible to prevent a fake item from being determined mistakenly to be real.

As described above, also in a case (case of FIG. 11) where the probability of a fake item being determined mistakenly to be real is high, the mistaken determination can be avoided by conducting real-or-fake detention by using a maximum value of correlation values and a normalized score of the maximum value of the correlation values, so that ft is confirmed that it is possible to improve an accuracy of real-or-fake determination by conducting real-or-fake determination by adding, besides a maximum value of correlation values, a characteristic amount that represents how the correlation values are distributed, such as a normalized score of the maximum value of the correlation values.

Below, a result of testing for confirming an accuracy of real-or-fake determination will be explained. In this testing, 10 consecutive sheets are taken out from a package of 500 A-4 size sheets of office paper (C2 paper, product code V436, manufactured by Fuji Xerox Office Supply Co., Ltd.) and used as samples.

[Testing for Confirming FRR]

In this testing, on each of the A4-size samples, 40 reading regions were set at a substantially equal spacing (see FIG. 12).

It is to be noted tat, assuring a longitudinal direction of the samples to be vertical, coordinates of a center of a reading region of each of the samples under the condition that a left top corner of the sample with respect to its reading surface is assumed to be an origin point (0,0) are as follows:
(500,500), (500,1000), (500,1500), (500,2000), (500,2500), (500,3000). (500,3500), (500,4000), (1000,500), (1000, 1000), (1000,1500), (1000,2000), (1000,2500), (1000,3000), (1000,3500), (1000,4000), (1500,500), (1500,1000), (1500,1500), (1500,2000), (1500,2500), (1500,3000), (1500,3500), (1500,4000), (2000,500), (2000,1000), (2000,1500), (2000,2000), (2000,2500), (2000,3000), (2000,3500), (2000,4000), (2500,500), (2500,1000), (2500,1500), (2500,2000), (2500,2500), (2500,3000), (2500,3500), (2500,4000).

A FUJITSU fi-4010CU (flatbed type scanner) is used to read each of the samples at a resolution of 400 dpi and an 8-bit gray scale gradation.

As sizes of the reading regions, four sizes of 16 dots×16 dots (about 1 mm×1 mm), 32 dots×32 dots (about 2 mm×2 mm), 64 dots×64 dots (about 4 mm×4 mm), and 128 dots×128 dots (about 8 mm×8 mm) are set. It is to be noted that the individual reading regions are utilized both as a reference region and a verification region and, to reduce the number of times of reading, the whole surface is read by the scanner to take out data (data used as that of the reference region and that of the verification region) that corresponds to the individual reading regions from image data obtained by the reading and use it in real-or-fake determination. Further, sizes of the reference region and the verification region are combined as shown in the following Table 1 so that a size of the verification region is two or four times greater than that of the reference region based on a proportion of size lengths thereof.

TABLE 1

| Reference region | Collation region |
| --- | --- |
| 16 dots × 16 dots | 32 dots × 32 dots |
|  | 64 dots × 64 dots |
| 32 dots × 32 dots | 64 dots × 64 dots |
|  | 128 dots × 128 dots |
| 64 dots × 64 dots | 128 dots × 128 dots |
|  | 256 dots × 256 dots |
| 128 dots × 128 dots | 256 dots × 256 dots |

Further, by exploiting the fact that a manuscript bench of the scanner is somewhat larger than an A-4 size, four manners of placing the sample on the manuscript bench are set which include upper right butting as viewed from above of the manuscript bench (ordinary placing manner), lower left butting (whereby a position of the sample is shifted about 2 mm longitudinally and about 10 mm latitudinally with respect to the upper right butting manner), clockwise-turned rightward approaching (whereby the sample is turned clockwise by about one degree), and counterclockwise-turned leftward approaching (whereby the sample is turned counterclockwise by about one degree), to read each of the samples under conditions where it is placed on the manuscript bench according to each of these placing manners.

Further, in this testing, real-or-fake determination is conducted by manually combining data pieces that have been read under conditions where the sample is placed in the different manners as a combination of data of a reference region used for real-or-fake determination and data of a verification region. Since there are three manners of placing that can be combined for one manner of placing, in a single combination of those combinations of sizes of the reference region and the verification region shown in Table 1, on a single reading region for a single sample, real-or-fake determination is conducted 4×3=12 times; since the single sample has 40 reading regions and there are 10 samples, real-or-fake determination is conducted 12×40×10=4800 times for each combination of the sizes of the reference region and the verification region.

As described above, since data pieces of a reference region and a verification region used in real-or-fake determination are obtained by reading them under conditions where the sample was placed in the different manners and combined, when taking out data for a reading region from image data, a position of the reading region is corrected so that a center position of the reference region and that of the verification region coincide with each other approximately.

That is, if image data from which data of a reading region is to be taken out has been obtained by reading it under a condition where the sample is placed in the "upper right butting" manner, the position of the reading region is not corrected in particular. In the case of the "lower left butting-"manner, based on image data obtained by reading through the scanner, a shift amount in position of an edge of the sample is calculated to correct the position of the reading region. In the case of the "clockwise-turned rightward approaching"and "counterclockwise-turned leftward approaching" manners, on the other hand, based on image data, a position of a corner of the sample is detected, and based on the detected position of the corner, an actual position of the reading region after the sample is turned and moved is calculated, to correct the position of the reading region to be taken out as data from the image data (in which only the center position is to be corrected and a distortion in rotation is yet to be corrected).

As in the above description, real-or-fake determination is conducted by repeating processing to compute a correlation value between a partial region having the same size as a reference region in a verification region and the reference region by using the normalizing correlation method while shifting this partial region in the verification region by one dot to obtain (m−n+1)×(m−n+1) pieces of correlation values (where the reference region has a size of m dots×m dots and the verification region has a size of n dots×n dots) and to obtain a maximum value of the correlation values and a normalized score of the maximum value of the correlation values and by deciding whether the maximum value of the correlation values is not less than 0.3 and the normalized score of the maximum value of the correlation values is not less than 5.0.

Results of this testing are shown in Table 2 below.

TABLE 2

| Reference region | Collation region | Number of times of computation | FRR |
| --- | --- | --- | --- |
| 16 dots × 16 dots | 32 dots × 32 dots | 4800 | 19.02% |
|  | 64 dots × 64 dots | 4800 | 0.6458% |
| 32 dots × 32 dots | 64 dots × 64 dots | 4800 | 0.1250% |
|  | 128 dots × 128 dots | 4800 | 0.0833% |
| 64 dots × 64 dots | 128 dots × 128 dots | 4800 | 0.0208% |
|  | 256 dots × 256 dots | 4800 | 0.0000% |
| 128 dots × 128 dots | 256 dots × 256 dots | 4800 | 3.8750% |

As may be clear from Table 2, under reading conditions of a resolution of 400 dpi and a gradation of an 8-bit gray scale, assuming the size of the reference region to be 32 dots×32 dots and that of the verification region to be 64 dots×64 dots, it can be understood that the FRR can be reduced to such a low value as to cause no problem practically. Further, it is clear Ut these reading conditions can be easily realized with an inexpensive scanner commercially available and it is unnecessary to use an expensive reader such as a microscope etc. in reading.

Further, in the above-described testing, as a result of analysis conducted with respect to a case of mistaken real or-fake determination (where a real item is determined mistakenly to be fake), it is clear that there is a tendency that the mistaken determination is liable to occur especially when the sample is turned clockwise or counterclockwise. Therefore, it may be anticipated that the FRR can be improved easily by taking countermeasures to prevent or mitigate rotation distortions, for example, by detecting and correcting a rotation distort on, taking care not to rotate a piece of paper to be read when it is placed on the manuscript bench of the scanner, or providing the manuscript bench of the scanner with such a structure that the piece of paper cannot easily be rotated.

[Testing for Confirmation of FAR]

As in the case of FRR testing, data that corresponds to a reference region and data that corresponds to a verification region are taken out from image data obtained by reading the whole surface of an A-4 size sample at a resolution of 400 dpi and an 8-bit gray scale gradation.

Since the FAR is a probability of a fake item being determined mistakenly to be real, in testing for confirming the FAR, all of the regions on the sample can be utilized as the verification region In this testing, correlation values are computed between all of the regions other than the reference region on the A4 size surface and the reference region, and if an item is decided to be fake based on a maximum value of the correlation values and a normalized score of the maximum value of the correlation values, it is self-apparent that the item would be decided to be fake in any given verification region on the same sample. Therefore, the verification region is defined as a region with a size of 3307 dots×4676 dots obtained by reading, at a 400-dpi resolution, the whole region read by the scanner including the whole surface of the A4-size sample.

Further, in this testing, the number of samples is set to 5, for each of which samples four reading regions are set at an approximately equal spacing on the whole surface thereof. It is to be noted that, as calculated as the number of dots at 400 dpi central coordinates of the reading regions are: (500, 500), (500, 3500), (2500, 500), and (2500, 3500). Further, the following four sizes of the reference region are given: 16 dots× 16 dots, 32 dots×32 dots, 64 dots×64 dots, and 128 dots×128 dots.

Since real-or-fake determination is conducted on four reference regions on one sample with respect to the whole surfaces of the other four samples, real-or-fake determination is conducted for each sample 4 (positions)×4 (samples)=16 times. Since this determination is conducted for the five samples, real-or-fake determination is conducted 5×16=80 times in total. Although this would seem to be small relative to the number of times for the testing of FRR confirmation, this just appears to be so because, as described above, the whole region read by the scanner including the whole surface of the A4-size sample is defined as a verification region, and thus if the verification region is divided into small regions, the above real-or-fake determination would have been conducted at least 10 million times.

Results of this testing are shown in Table 3 below.

TABLE 3

| Reference region | Number of times of computation | FAR |
| --- | --- | --- |
| 16 dots × 16 dots | 80 | 31.250% |
| 32 dots × 32 dots | 80 | 0.0000% |
| 64 dots × 64 dots | 80 | 0.0000% |
| 128 dots × 128 dots | 80 | 0.0000% |

As is clear from Table 3, in all the cases other than a case where the reference region has a size of 16 dots×16 dots, the FAR is 0.0000%, and therefore, even if a verification region is divided into small regions having an arbitrary small size and subjected to real-or-fake determination, it is ensured that the FAR is 0.0000%.

On the other hand, in a case where the reference region has a size of 16 dots×16 dots, the FAR takes on an impractical value of 31.250%. This is the worst value; although the FAR may be improved by dividing a verification region into smaller regions, as a result of the above-described FRR config testing, it is found that the real-or-fake determination accuracy in a case where the reference region has a size of 16 dots×16 dots is lower than that in a case where it has a larger size. Therefore, it is made clear that, at a resolution of 400 dpi, a lower limit of the size of the reference region should be 32 dots×32 dots.

Figure 13A:
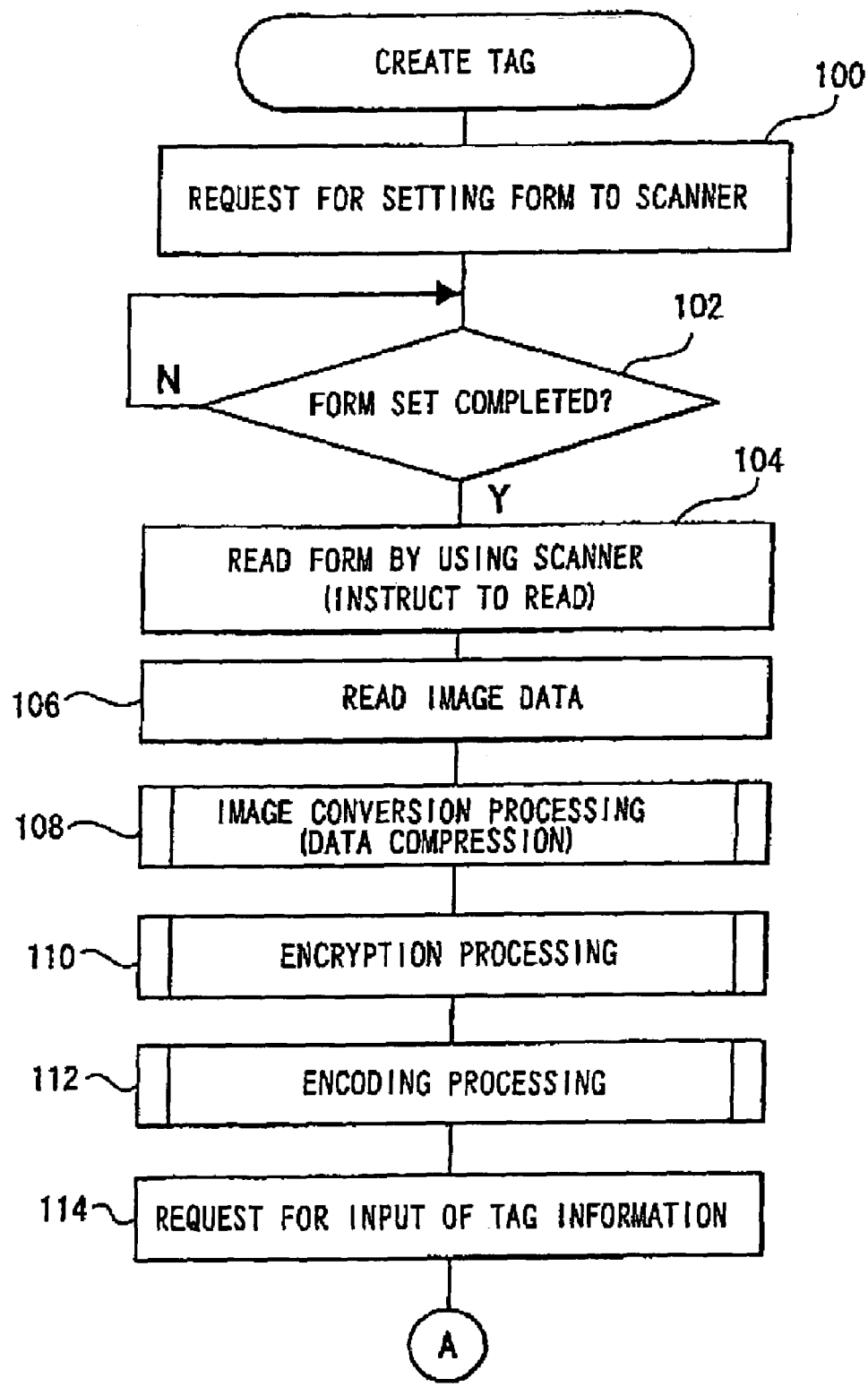
FIGS. 13A and 13B show a flowchart of one example of tag creation processing according to an present embodiment.
Figure 13B:
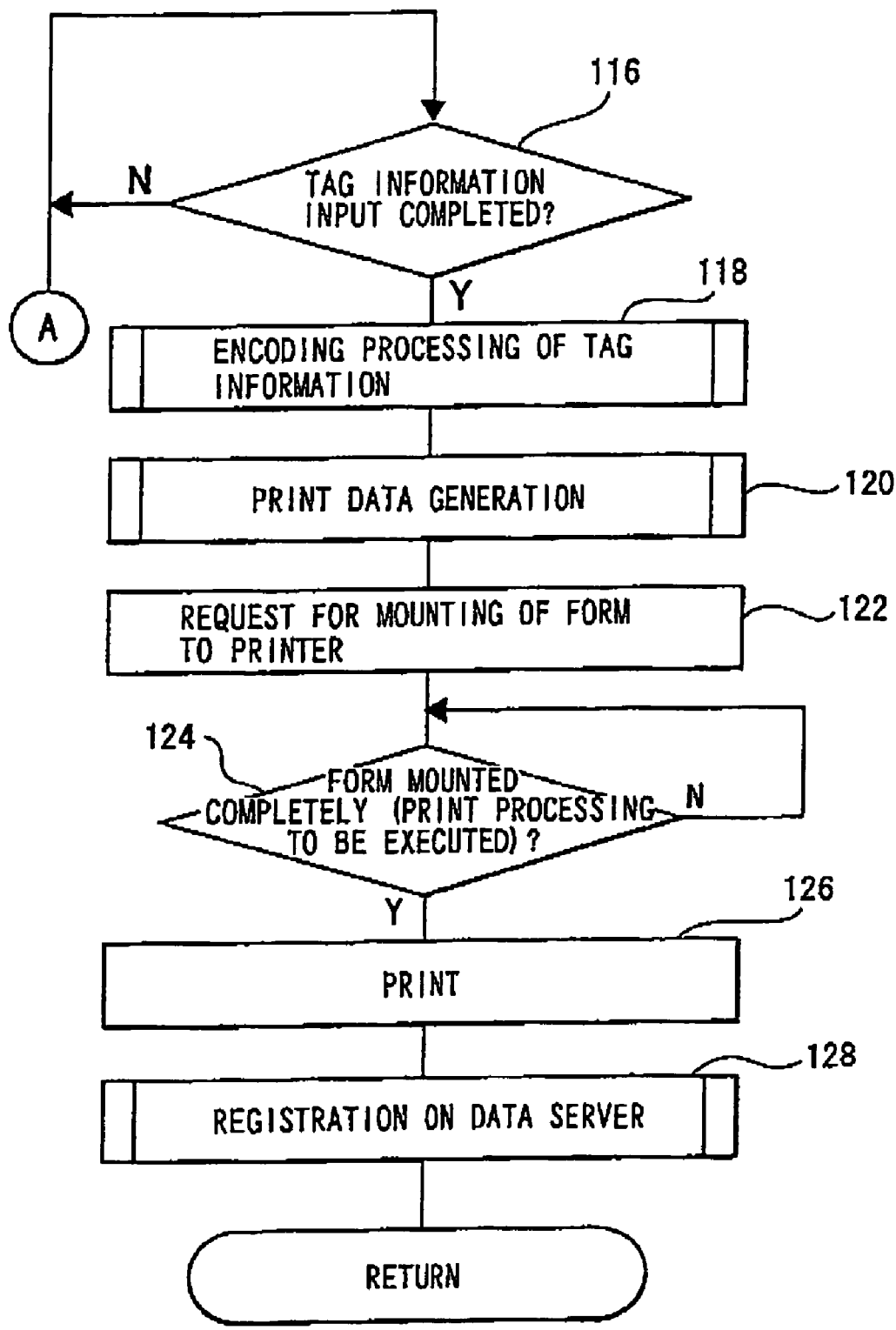

As described above, under conditions of a resolution of 400 dpi and an 8-bit gray scale gradation, real-or-fake can be conducted at high determination accuracy by defining a region having a size of at least 32 bits×32 bits as a reference region Next, creation and authentication of the tag 30 in the tag management system 10 will be described. FIGS. 13A and 13B shows an outline of processing (tag creation processing) performed in the tag creation apparatus 12.

In this flowchart which is implemented to create the tag 30, at first step 100, a prompt is shown on a display (display device) for setting the paper sheet 32 used to create the tag 30 on a mounting bench of the scanner 20, and at step 102, it is confirmed whether the paper sheet 32 is set on the scanner 20.

If the paper sheet 32 is set on the scanner 20 and reading of a registered image is instructed, an affirmative detection is made in step 102, the process proceeds to step 104, and a predetermined region on the paper sheet 32 is read. In this case, a format of the tag 30 is preset on the PC 18, in accordance with which the registration region 52 (see FIG. 4A) is read. In this case, the scanner 20 reads light reflected by a surface of the paper sheet 32 to obtain a characteristic having randomness over the surface of the paper sheet 32, thereby outputting image data in accordance with irregularities in the surface of the paper sheet 32.

Further, the scanner 20 reads a region with a size of 32 bits×32 bits (about 2 mm×2 mm) at a 400-dpi resolution and an 8-bit gray scale to provide a data size of 1024 bytes, thus resulting in an integer of a gradation value of each of dots in a range of 0-255. One example of an image visualized in this case (image corrected in terms of contrast for easy visualization) is shown in FIG. 4B.

It is to be noted that if the paper sheet 32 is mounted to a constant position, the registration region 52 on the paper sheet 32 may be identified with reference to an origin that is set in accordance with this position; and if the size of the paper sheet 32 is constant, an arbitrary method such as a method of detecting an edge of the paper sheet 32 and identifying the registration region based on this edge can be applied.

Further, since this registration region 52 is a non-image region on the tag 30, it is possible to prevent mistaken determination in authentication owing to attaching of toner etc. during creation of the tag 30.

When the image data output from the scanner 20 is read as image data of the registered image at step 106, the process proceeds to step 108 to perform image conversion processing. In this case, discrete cosine transform etc. is applied to the image data to compress it Further, a secret key and a public key are preset to the tag management system 10, so that the compressed data is encrypted by using the secret key at step 110.

Then, at step 112, the process uses a reading section such as the scanner is used to encode the encrypted data into codes of a format enables automatical reading of the data. It is to be noted that in this case, two-dimensional encoding is employed such as QR encoding so that the encoded image 50 of two-dimensional code corresponding to the encrypted data can be obtained It is to be noted that although the data is encrypted by using the secret key at step 110, the encryption processing, although not indispensable, should preferably be performed in order to inhibit replication of the tag 30.

Further, although a method is available of using the public key in encryption and the secret key in decryption, the method of using the secret key in encryption is more preferable because it is necessary to use the secret key in authentication of the tag 30 in this case.

On the other hand, concurrently with the processing of the image data read from the registration region 52 of the paper sheet 32, for example, a prompt is given for input of tag information on the display at step 114 so that input of the tag information can be prompted, and it is confirmed whether the tag information is input completely at step 116.

Accordingly, an input device such as a keyboard is used to input the tag information through a user interface (UI) etc. indicated on the display, and when having confirmed the input of the tag information has been confirmed, an affirmative determination is made at step 116 and the process proceeds to step 118.

The tag information input in this case includes a product name, a model number, a serial number, etc. of a product to which the tag 30 is affixed; further, if the tag is affixed to a packaged body (or multi-pack body) in which plural products are packaged (or baled), the number of the products is also input Further, to the tag 30, in addition to information about a product, a serial number set for each of the tags 30 is input as information of the tag 30 itself. Furthermore, to the tag information, time information can be added such as a creation date or an expiration date of the tag 30 for the tag 30 or a product to which the tag 30 is affixed.

At step 118 the input tag information is encoded into codes (two-dimensional codes such as QR codes) of a format that enables automatical reading of the codes by using a reading section such as the scanner so that the code image 48 indicative of the tag information can be obtained.

When an image of the registration region 52 and the tag information are thus encoded completely, at step 120 bitmap data is created so that the code image 48 into which the tag information is encoded, the encoded image 50 that corresponds to the image data in the registration region 52, etc. can be printed onto the paper sheet 32 in a predetermined format. In this case, the bitmap data is created in such a manner that the closing line 56 that clearly defines the authentication region in which the registration region 52 is contained can be printed.

Then, at step 122 a request is given on the display for mounting the paper sheet 32 from which the registration region 52 has been read onto the printer 22, and at step 124, it is confirmed whether this paper sheet 32 is mounted to the printer 22, and performing of print processing is instructed.

If the paper sheet 32 is mounted to the printer 22 and print processing on the paper sheet 32 is instructed, an affirmative determination is made at step 124 and the process proceeds to step 126 to perform the print processing.

Accordingly, together with the code image 48 indicative of the tag information, the encoded image 50 that corresponds to the image data of the registration region 52 is printed, while on the other hand, the tag 30 is output under a condition where the authentication region 54 including the registration region 52 is left blank in an unprinted state.

Further, at step 128, the image data read from the registration region 52 is registered. In this registration processing, the image data read from the registration region 52, data obtained by encrypting this image data, or data obtained by further encoding the encrypted data is registered on the data server 16 under a condition where it is correlated with tag information such as information of the tag 30 itself such as serial number or information of a product to which the tag 30 is affixed.

The created tag 30 is affixed to each product, each packaged body in which a product is packaged, for each packaged or multi-pack body in which plural products are packaged or baled together respectively.

Further, for example, if a product is commercially available, the tag 30 only needs to be affixed to the product or a packaged or multi-pack body in which the products are packaged or baled respectively, in such a manner that cords etc. interconnecting the tag and the product can be cut or the tag 30 can be torn by a purchaser to disable reusing the tag, or the tag 30 only needs to be affixed to an exterior of the packaged or multi-pack body in such a manner that the tag 30 can be removed by tearing it or the exterior of the package.

Further, although in the tag creation apparatus 12 applied to the present embodiment, the scanner 20 for reading the registration region 52 from the paper sheet 32 and the printer 22 for performing print processing on the paper sheet 32 are separate from each other, it can use a print processing apparatus can be used that combines a scanner functions and a printer function to enable consecutive print processing on the paper sheet 32 from which an image has been read by the scanner function, so that the encoded image 50 that corresponds to image data read from the registration region 52 can be printed surely on the relevant paper sheet 32, which is more preferable.

Figure 14A:
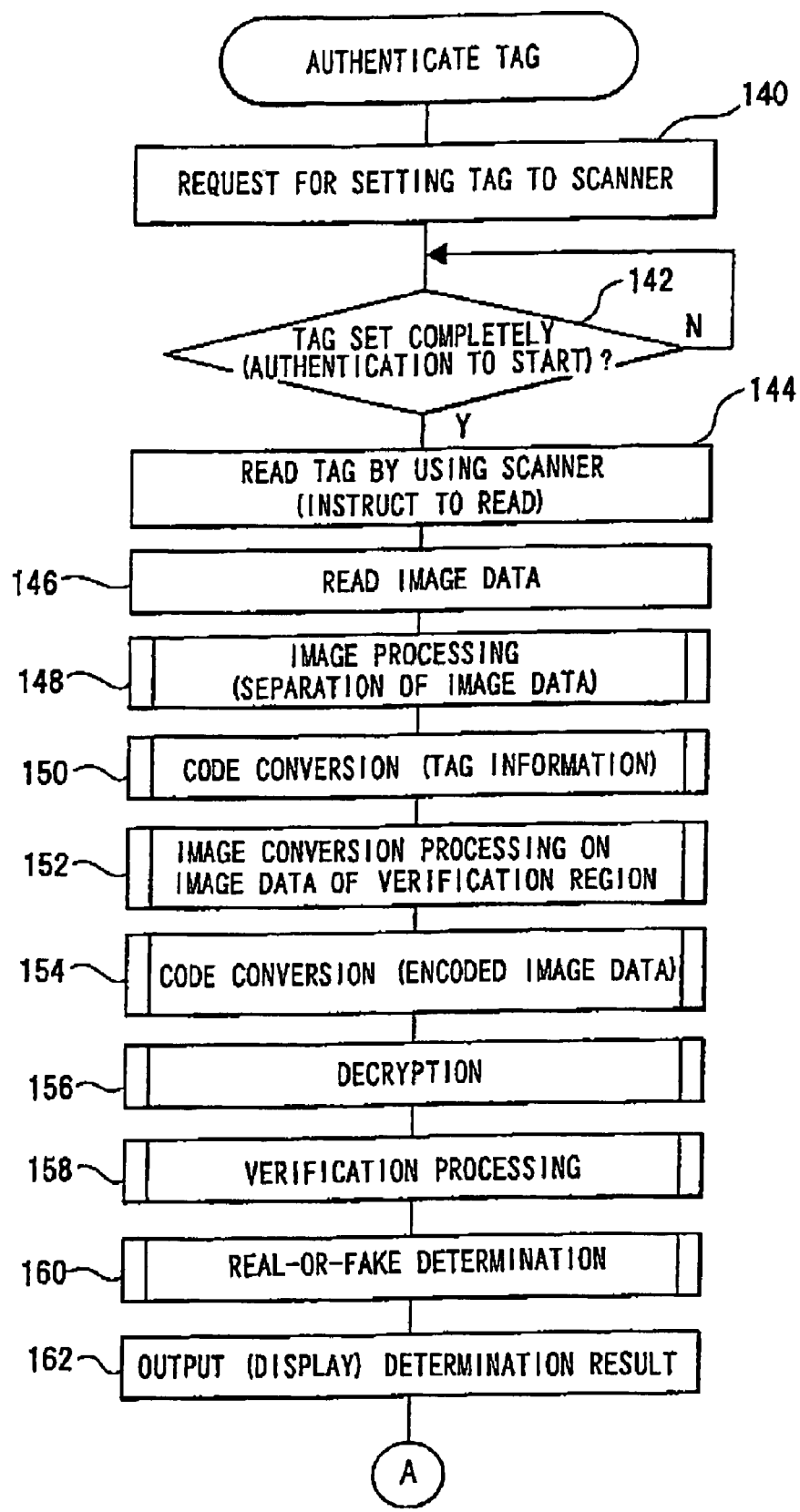
FIGS. 14A and 14B show a flowchart of one example of tag authentication processing according to an embodiment.
Figure 14B:
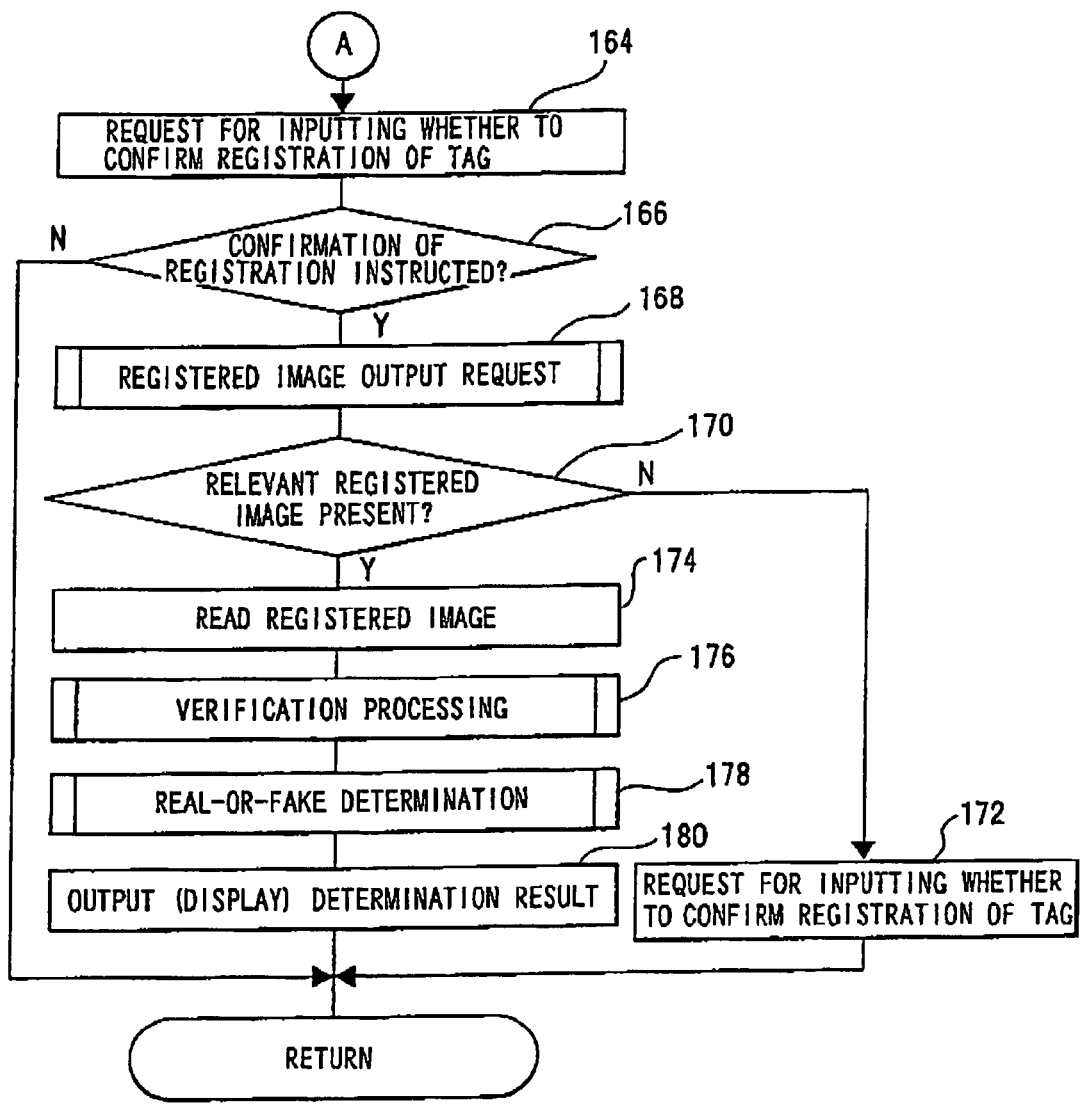

Next, how to authenticate the tag 30 by using the tag authentication apparatus 14 will be described with reference to FIGS. 14A and 14B. At the first step 140 of the flowchart, for example, a request is displayed on the display (display device) of the PC24, to request mounting of the tag 30 to be authenticated onto the scanner 26. Further, at step 142, it is confirmed whether the tag 30 is mounted to the scanner 26 completely, and performance of authentication processing on the tag 30 is instructed.

When performing of the authentication processing is instructed under a condition where the tag 30 is mounted on the manuscript bench of the scanner 26, an affirmative determination is made at step 142 and the process proceeds to step 144. Accordingly, the scanner 26 is instructed to read the tag 30 and reads it to output image data, which image data is read at step 146.

In this case, the tag 30 may be read either entirely or a predetermined range of regions thereof may be read which includes at least the code image 48 and the encoded image 50 which are printed on the tag 30 and the verification region 54 provided between the code image 48 and the encoded image 50. Further, the code image 48, the encoded image 50, and the verification region 54 may be read separately from each other.

At the next step 148, image processing is performed on the image data input from the scanner 26, to separately extract the image data of the code image 48, that of the encoded image 50, and that inside the verification region.

Then, at step 150, code conversion processing is performed on the image data of the code image 48, to extract tag information from the two-dimensional codes. Further, at step 152, predetermined image conversion is performed on the image data of the verification region 54.

Further, at step 154, processing is performed on the image data of the encoded image 50 to extract data converted into two-dimensional codes. The at step 156, the data converted from the two-dimensional codes is decoded by using the public key, to obtain image data recorded as image data of the registration region 52.

When the image data that corresponds to the registration region 52 and the image data of the verification region 54 contained in the registration region 52 has been obtained, the process proceeds to step 158 to perform verification processing.

That is, when registered image data of the registration region with a size of 32 bits×32 bits and image data of the authentication region 54 having a preset size of 64 bits×64 bits has been obtained at step 158, verification processing is performed using the registered image data as reference data and the image data of the authentication region 54 as verification data, thereby computing a maximum value of correlation values and a normalized score of the maximum value of the correlation values.

At the next step 160, real-or-fake determination is performed by comparing the registered image data, the magnum value of the correlation values of the authentication image data, and the normalized score of the maximum value of the correlation values that were obtained by the verification processing (computation processing) to preset threshold values (for example, threshold value for the maximum value of the correlation values≅5.0 and threshold value of the normalized score of the maximum value of the correlation values≅0.3) and, at step 162, a result of this real-or-fake determination is output by, for example, being displayed on the display etc.

On the other hand, at step 164, prompting for inputting whether it is necessary to confirm registration of the tag 30 is performed by, for example, displaying whether to confirm the registration on the display, and if confirmation of the registration is instructed, an affirmative determination is made at step 166 and the process proceeds to go to step 168.

At this step 168 the data server 16 is requested to output the registered image data of the tag 30 based on a serial number (serial number of the tag 30) recorded as the tag information of the tag 30, and at step 170, it is confirmed whether the relevant data (registered image data) is present.

In this case, if no relevant registered image data is found, that is, if the tag 30 is not registered at the data server 16, a negative determination is made at step 170 and the process proceeds to step 172, where it is output that the relevant tag information and the registered image data are not present at the data server 16 and that the relevant tag 30 is likely to be fake by, for example, displaying it on the display.

If, on the other hand, the registered image data is present which corresponds to a serial number recorded as the tag information, an affirmative determination is made at step 170, and the process proceeds to step 174 to read the relevant registered image data from the data server 16 and then proceeds to step 176.

At this step 176, the read registered image data is compared with image data from the verification region 54. In this verification also, a maximum value of correlation values and a normalized score of the maximum value of the correlation values are computed by using the image data of the authentication region of the tag 30 to be authenticated as verification data, and at step 178, real-or-fake determination is conducted based on a result of this computation, and a result of the determination is output.

The paper sheet 32 has a peculiar characteristic that has randomness over the surface thereof The tag creation apparatus 12 records, as the encoded image 50, image data read from the registration region 52 set on the paper sheet 32 on the tag 30 created using the paper sheet 32.

The tag authentication apparatus 14 can compare image data indicated by the encoded image 50 and image data in the authentication region 54 of the tag 30 with each other to determine whether the tag 30 is an original item (real item) created by the tag creation apparatus 12 or whether it has been created by replication etc. and, if the tag 30 is not real determines that a product or a packaged or baled product to which this tag is affixed is a similar product or an imitation of the real item or that it is not manufactured by the original manufacturing factory or company (hereinafter referred to as a fake item in contrast to real item).

That is, if a tag (hereinafter referred to as a "fake tag") affixed to a fake item is just copied from the real tag 30, the paper sheet 32 is different and thus not authenticated by the tag authentication apparatus 14.

Therefore, based on whether the tag 30 is authenticated or not, it is possible to determine whether a product or a packaged or baled product to which the tag 30 is affixed is real.

On the other hand, it may be suspected that, as in the case of the tag 30, a characteristic of a predetermined region set on the paper sheet 32 is read and printed on the paper sheet 32 as an encoded image to create a fake tag, thus resulting in the fake tag having the characteristic peculiar to the surface of the paper sheet 32.

To prevent such a fake tag from being created, the tag creation apparatus 12 uses a secret key in encryption. Further, the tag management system 10 registers the created tag 30 at the data server 16.

If data is encrypted using a secret key, the data can be easily decrypted using a public key, but it is difficult to perform encryption, which will make accurate decryption possible, by using the public key. Accordingly, the encrypted encoded image 50, even if printed on the paper sheet 32, cannot be authenticated by the tag authentication apparatus 14.

It is to be noted that, although an encrypting method is available in which a secret key is used in decryption, since authentication is inhibited (only those having the secret key can authenticate tags), an effect of suppressing creation of a fake tag is reduced, and thus it is preferable for the side of authentication to use a public key.

On the other hand, due to registration of the real tag 30 on the data server 16, even if a fake tag is determined to be real tag as a result of comparing the encoded image 50 and the authentication region 54 on the paper sheet 32 with each others, since the fake tag is not registered on the data server 16, the verification region 54 of the paper sheet 32 and the image data registered on the data server 16 cannot be verified with each other or the tag is determined to be fake based on a result of the verification.

Therefore, by performing at least one of encryption by use of a secret key or registration on the data server 16, it is possible to properly determine whether a tag is real or fake even if it is elaborately imitated.

It is to be noted that rather than performing encryption by use of a secrete key, only registration on the data server 16 may be performed, in which case, however, it is preferable to enhance the security of the data server 16 so that a third party cannot rewrite data or register it.

By thus utilizing a characteristic having randomness over the surface of the paper sheet 32 that constitutes the tag 30, the tag management system 10 can conduct real-or-fake determination on the tag 30 while preventing it from being, for example, forged, thereby accurately determining whether a product to which the relevant tag 30 is affixed is real or fake.

Further, in a case where such a tag 30 is used, before the tag 30 is authenticated, it is necessary to confirm that the tag 30 has not been replaced or changed, based on, for example, how the relevant article is packaged or baled, thereby enabling preventing real-or-fake determination on products from being disabled due to a real tag 30 being reused and affixed to a fake product.

Therefore, a configuration may be added to the tag 30 such that the tag 30 cannot be replaced or such that, if it is replaced, this fact is apparent due to lettering on the like.

Further, time information such as an expiration date of the tag 30 may be added to the tag 30 as its tag information so that the tag 30 may be authenticated including the time information, thereby enabling preventing one tag 30 from being reused for a long time and at least inhibiting a large number of fake items from being put into circulation.

Furthermore, in a process of manufacturing of products, there are some cases where a primary-processed product is secondary-processed in another factory or company. In such a case, when the primary-processed product is manufactured, the tag 30 can be created and affixed to the product so that the tag 30 may be authenticated when the product is shipped or carried into a secondary-processing factory, thereby preventing a fake primary-processed product from being carried into the secondary-processing factory.

In this case, a newly created tag 30 may be affixed to the secondary-processed product, in which case preferably the tag affixed to the primary-processed product is surely recovered, torn, or at least at the encoded image 50 or the authentication region 54 thereon is destroyed (marked) by using ink etc. so that the information cannot easily be read properly.

Further, when a secondary-processed product is shipped, it is preferable to supply the tag 30, when it is to be used affixed to the primary-processed product, with information about the secondary processing as tag information and to update information registered on a management database (data server 16).

Further, in the tag management system 10, in a process of distribution, storage, etc., of products, authentication or verification by use of information registered on the data server 16 may be performed without notice, thereby enabling accurately managing distribution of the products and preventing a fake item from being mixed in the process of distribution.

It is to be noted that the above-described embodiment is not intended to limit the present invention. For example, although the present embodiment has used the scanners 20 and 26 to read registered image data from the paper sheet 32 of the tag 30 or the code image 48, the encoded image 50, or the authentication region 52 from the tag 30, these scanners 20 and 26 may be a flat bed type one, an auto-feed type one that enables reading a form while automatically feeding it, or a handy-scanner. Furthermore, besides a scanner, a digital camera etc. can be applied.

That is, an image could be read by properly combining an arbitrary photographing section having a predetermined resolution such as a CCD line sensor Or a CCD area sensor and a light source used for image reading.

Further, although the present embodiment has been described with reference to a case of applying a piece of paper (paper sheet 32) as an individual piece that constitutes the tag 30, a material and a shape of a tag of the present invention are not limited thereto. Since quality printing not only on a resin plate but also on a block-shaped individual piece has been made possible by improvements in printing technologies, an arbitrary material for the tag can be used as far as it has irregularities that have uncontrollable randomness in its surface or uncontrollable randomness in distribution of transmitted light.

Further, in the tag creating method of the present invention, the image information read from the first region may be encrypted and converted into the individual piece information.

It is thus possible to restrict forming of a piece information image that enables conducting of appropriate real-or-fake determination, thereby preventing a tag from being replicated or forged.

Further, in the tag creating method of the present invention, the tag information may include information of the article to which the tag is affixed.

It is thus possible to identify a tag, so that by, for example, separately storing (registering) piece information of an individual piece of the tag, more accurate real-or-fake determination can be conducted.

Further, in this article management system, the conversion section may include a decryption section for decrypting encryption when the individual piece information is encrypted to form the individual piece information image on the individual piece.

Furthermore, the article management system, may farther include a registration-holding section for registering and holding the individual piece information along with tag information, wherein when a tag information image based on tag information that makes the tag identifiable is formed on the individual piece the reading section reads the tag information image; and the verification section also decides whether the article is real or fake according to whether the tag is registered in the holding section based on the tag information indicated in the tag information image read by the reading section.

What is claimed is:

1. A method of creating a tag, which is to be affixed to an article, the method comprising:
    reading, over a first region of a surface of an individual piece, a characteristic having randomness distributed over the surface of the individual piece and converting image information indicative of the read characteristic of the first region into individual piece identification information uniquely identifying the individual piece;
    forming an individual piece identification information image indicative of the individual piece identification information on the surface of the individual piece outside of a second region that includes the first region, the second region being larger than the first region; wherein the individual piece identification information is verified by shifting a partial region extracted from the second region across the second region by a distance smaller than the dimension of the first region and comparing the read characteristic of the first region with the read characteristic of the partial region.

2. The method according to claim 1, wherein a two-dimensional code is used as the individual piece identification information, and the individual piece identification information image formed on the surface of the individual piece is a two-dimensional code image.

3. The method according to claim 1, wherein the image information read from the first region is encrypted and converted into the individual piece identification information.

4. The method according to claim 1, wherein a tag information image based on tag information that makes the tag identifiable is formed on the individual piece.

5. The method according to claim 4, wherein the tag information comprises information of the article to which the tag is affixed.

6. An apparatus for creating a tag, the apparatus comprising:
 a first region reading section for reading, over a first region of a surface of an individual piece, a characteristic having randomness distributed over the surface of the individual piece which is used to create a tag to be affixed to an article;
 a read information conversion section for converting image information indicative of the first region read by the first region reading means into individual piece identification information uniquely identifying the individual piece; and
 an image forming section for forming an individual piece identification information image indicative of the individual piece identification information converted by the read information conversion section on the surface of the individual piece outside of a second region that includes the first region, the second region being larger than the first region, wherein
 the individual piece identification information is verified by shifting a partial region extracted from the second region across the second region by a distance smaller than the dimension of the first region and comparing the read characteristic of the first region with the read characteristic of the second region.

7. The apparatus according to claim 6, further comprising a code conversion section for converting the individual piece identification information into a two-dimensional code, wherein a two-dimensional code image is formed as the individual piece identification information image.

8. The apparatus according to claim 6, further comprising an encryption section for encrypting the individual piece identification information, wherein the image forming section forms the individual piece identification information image based on the encrypted individual piece information.

9. The apparatus according to claim 6, further comprising an input section to which tag information that makes the tag identifiable is input, wherein the image forming section forms a tag information image based on the tag information from the input section, on the individual piece.

10. The apparatus according to claim 9, wherein information of the article to which the tag is affixed is comprised in the tag information.

11. A tag which is made of an individual piece over whose surface a characteristic having randomness is distributed, wherein a second region including a first region which is larger than the first region and which is set on the surface of the individual piece is provided as a portion not containing any image, and an individual piece identification information image, which makes the individual piece identifiable, is formed outside of the second region based on the characteristic indicative of the first region read from the first region.

12. An article management system for managing an article to which a tag is affixed in which tag: a second region including a first region, and being larger than the first region, and set on a surface of an individual piece on which a characteristic having randomness is distributed is provided as a region not containing any image; and an individual piece identification information image, which makes the individual piece identifiable, is formed based on the characteristic indicative of the first region read from the first region, the system comprising:
 a reading section for reading the characteristic of the surface of the individual piece in the second region and the individual piece identification information image;
 an information conversion section for converting the characteristic of the second region read by the reading section and individual piece identification information based on the individual piece information image into information that can be contradistinguished; and
 a verification section for verifying whether the first region identified by the individual piece identification information is contained in the second region by shifting a partial region extracted from the second region across the second region by a distance smaller than the dimension of the first region and comparing the read characteristic of the first region with the read characteristic of the partial region,
 wherein based on a result of the verification by the verification section, whether the article is real or fake can be decided.

13. The article management system according to claim 12, wherein the conversion section comprises a decryption section for decrypting encryption when the individual piece identification information is encrypted to form the individual piece identification information image on the individual piece.

14. The article management system according to claim 12, further comprising a registration-holding section for registering and holding the individual piece identification information along with tag information, wherein when a tag information image based on tag information that makes the tag identifiable is formed on the individual piece:
 the reading section reads the tag information image; and
 the verification section also decides whether the article is real or fake according to whether the tag is registered in the holding section based on the tag information indicated in the tag information image read by the reading section.

15. The article management system according to claim 14, wherein the verification section compares the individual piece identification information registered on the registration-holding section and the characteristic of the second region with each other.

* * * * *